(12) United States Patent
Li et al.

(10) Patent No.: US 12,138,813 B2
(45) Date of Patent: Nov. 12, 2024

(54) ADAPTIVE SCOUTING USING MULTI-LEGGED ROBOTS

(71) Applicant: Deere & Company, Moline, IL (US)

(72) Inventors: Yueqi Li, San Jose, CA (US); Alexander Ngai, Irvine, CA (US)

(73) Assignee: DEERE &CO., Moline, IL (US)

( * ) Notice: Subject to any disclaimer, the term of this patent is extended or adjusted under 35 U.S.C. 154(b) by 311 days.

(21) Appl. No.: 17/741,102

(22) Filed: May 10, 2022

(65) Prior Publication Data

US 2023/0364796 A1 Nov. 16, 2023

(51) Int. Cl.
| | |
|---|---|
| *B25J 13/08* | (2006.01) |
| *B25J 9/16* | (2006.01) |
| *B25J 15/00* | (2006.01) |
| *B25J 19/02* | (2006.01) |
| *B62D 57/032* | (2006.01) |
| *G06V 20/10* | (2022.01) |
| *H04N 13/204* | (2018.01) |

(Continued)

(52) U.S. Cl.
CPC ............. *B25J 9/1697* (2013.01); *B25J 13/08* (2013.01); *B25J 15/0066* (2013.01); *B62D 57/032* (2013.01); *G06V 20/188* (2022.01); *H04N 13/204* (2018.05); *H04N 13/296* (2018.05)

(58) Field of Classification Search
CPC ...... B25J 9/1697; B25J 13/08; B25J 15/0066; B25J 19/023; B62D 57/032; G06V 20/188; H04N 13/204; H04N 13/296
See application file for complete search history.

(56) References Cited

U.S. PATENT DOCUMENTS

| | | | |
|---|---|---|---|
| 2006/0213167 A1* | 9/2006 | Koselka | A01D 75/00 56/10.2 A |
| 2014/0168412 A1* | 6/2014 | Shulman | G06V 20/20 348/89 |

(Continued)

FOREIGN PATENT DOCUMENTS

CN 110008894 A * 7/2019

OTHER PUBLICATIONS

Atefi, Robotic Technologies for High-Throughput Plant Phenotyping: Contemporary Reviews and Future Perspectives, Jun. 25, 2021, Frontiers in Plant Science, 12, 611940 (Year: 2021).*

(Continued)

*Primary Examiner* — Adam R Mott
*Assistant Examiner* — Heather J Keniry
(74) *Attorney, Agent, or Firm* — Hanley, Flight & Zimmerman, LLC

(57) ABSTRACT

Implementations are described herein for reducing the time and costs associated with the crop scouting in a crop field. In various implementations, a method is implemented using one or more processors, and the method include: operating, based on a type and arrangement of a crop field, a robot to travel along a trajectory through the crop field using a first gait. The robot includes one or more vision sensors. The first gait includes a first repeating cycle of poses of the robot. The method can further include: synchronizing operation of one or more of the vision sensors with one or more poses of the first repeating cycle of poses of the multi-legged robot to capture one or more initial sequences of images depicting one or more points-of-interest of crops growing in the crop field.

20 Claims, 14 Drawing Sheets

(51) Int. Cl.
*H04N 13/239* (2018.01)
*H04N 13/296* (2018.01)

(56) References Cited

U.S. PATENT DOCUMENTS

| | | | | |
|---|---|---|---|---|
| 2015/0120128 A1* | 4/2015 | Rosenstein | ............ | G06T 7/246 701/28 |
| 2016/0050852 A1* | 2/2016 | Lee | ............ | B25J 9/023 901/41 |
| 2018/0146618 A1* | 5/2018 | Elazary | ............ | A01D 46/30 |
| 2020/0047337 A1* | 2/2020 | Williams | ............ | B25J 9/1676 |
| 2020/0126232 A1* | 4/2020 | Guo | ............ | G06V 10/82 |
| 2020/0193589 A1* | 6/2020 | Peshlov | ............ | G06V 10/82 |
| 2020/0281122 A1* | 9/2020 | Mor | ............ | A01F 15/00 |
| 2021/0147016 A1* | 5/2021 | Stephens | ............ | B25J 9/1633 |
| 2022/0132737 A1* | 5/2022 | Anderson | ............ | A01D 45/00 56/10.2 E |
| 2022/0176544 A1* | 6/2022 | Chandler | ............ | B25J 11/0055 |
| 2022/0318552 A1* | 10/2022 | Chowdhary | ............ | G06T 7/70 |
| 2023/0102576 A1* | 3/2023 | Yaroshenko | ............ | G05D 1/0246 702/2 |
| 2023/0165181 A1* | 6/2023 | Scheiner | ............ | A01M 7/0089 47/1.41 |
| 2024/0007822 A1* | 1/2024 | Young | ............ | G06V 20/56 |

OTHER PUBLICATIONS

Dope Tech: Boston Dynamics Robot Dog !; Video retrieved from https://www.youtube.com/watch?v=s6_azdBnAIU; dated Aug. 10, 2020.

Biswal et al., "Development of quadruped walking robots: A review" Ain Shams Engineering Journal 12 (2021) 2017-2031.

Crop Scouting Tips and Tricks; Video retrieved from https://www.youtube.com/watch?v=1tvk2t_2sZY; dated May 21, 2020.

Chen et al., "A Trot and Flying Trot Control Method for Quadruped Robot Based on Optimal Foot Force Distribution" Journal of Bionic Engineering 16 (2019) 621-632.

* cited by examiner

ADAPTIVE SCOUTING USING MULTI-LEGGED ROBOTS

BACKGROUND

An agricultural field (also referred to as "crop field" or "plot") is often large and diversified to embrace the high yield and healthy growth of different crops. Crop scouting is essential to help growers and scientists understand and timely address issues such as insects, weeds, diseases, to ensure the health and high yield of the crops. However, due to the complexity and/or size of the agricultural field, growers and scientists may find it overwhelming to manually scout the field and monitor crops, e.g., to collect representative yet comprehensive data (e.g., images) for the purpose of data recording and analysis.

SUMMARY

Implementations are described herein for reducing or eliminating the stress, intensive labor, time, and costs associated with the data collection for crops growing in a large and diversified agricultural field ("field"). In some implementations, robots are adapted to walk in the field for crop scouting; such a robot can be a multi-legged robot that collects data for the crops growing in a field. The multi-legged robot may include multiple legs that are operable to cause the multi-legged robot to walk across the soil along a predefined trajectory of the field at a controllable speed. In many cases, the robot will include four legs, and many examples described herein will refer to such a "quadruped" robot. However, this is not meant to be limiting, and robots having more or less than four legs (e.g., bipedal, tripedal, or octopedal robots, or robots having other numbers of legs) are contemplated. In some cases, the quadruped robot may be designed to mimic an animal such as a dog, although this is not required. The pre-defined trajectory can be planned and adapted depending on a pattern (e.g., plant type and arrangement) of crops growing in the agricultural field. To perform crop scouting, the quadruped robot may be equipped with one or more sensors, to capture one or more images and/or other data (e.g., moisture, temperature, height) of the field or crop(s).

In some implementations, one or more sensor readings may be obtained while the quadruped robot is at a given pose (orientation, height, etc.) of a cycle of poses struck by the robot repeatedly while it travels along the pre-defined trajectory. For example, the quadruped robot can have a first gait (e.g., an upright walk) that includes a first repeating cycle of poses, where the quadruped robot travels along the predefined trajectory using the first gait. The first repeating cycle of poses can include a first starting pose, a first ending pose, and a plurality of intermediate poses between the first starting pose and the first ending poses, to allow the quadruped robot to move in a predefined direction for a predefined distance in the field. Depending on the type of the field and the type of the crops to be scouted, the first repeating cycle of poses can include a given pose (e.g., a bent-down pose or a stand-up pose) at a given point of time during the first repeating cycle for a sensor (e.g., vision or thermal) of the quadruped robot to capture an image that depicts a point-of-interest of the crop(s).

In various implementations, the quadruped robot can include one or more vision sensors, and the operation of the one or more visions sensors can be synchronized with one or more poses of the first repeating cycle of poses, to capture one or more initial sequences of images that depict one or more points-of-interest of the crops growing in the field. As a non-limiting example, the one or more vision sensors can include a first sensor and a second sensor, where operation of the first sensor can be synchronized with the first starting pose (or a first transitional pose of the plurality of intermediate poses) of the quadruped robot and operation of the second sensor can be synchronized with the first ending pose (or a second transitional pose of the plurality of intermediate poses) of the quadruped robot. The first sensor can be the same as or different from the second sensor.

In the above example, the first sensor can capture an image depicting a point-of-interest of the crops whenever the quadruped robot is in the first starting pose (or the first transitional pose), thereby providing a first initial sequence of images that depict one or more points-of-interest of the crops. The second sensor can capture an image depicting a point-of-interest of the crops whenever the quadruped robot is in the first ending pose (or the second transitional pose), thereby providing a second initial sequence of images that depict one or more points-of-interest of the crops. Accordingly, the one or more sensors (e.g., the first and second sensors) of the quadruped robot having the first and second sensors can capture one or more initial sequences of images depicting one or more points-of-interest of the crops growing in the field.

The one or more initial sequence of images can be processed to infer one or more phenotypic traits of the crops. For example, the one or more initial sequence of images can be processed using one or more phenotypic machine learning models that are trained to infer one or more phenotypic traits of the crops (e.g., crop type, crop growth stage, crop size, crop ripeness, crop health, whether pest infestation or disease is present, dehydration, etc.).

Optionally or additionally, the quadruped robot can have a second gait (e.g., a crawl in which the robot is lower to the ground) that includes a second repeating cycle of poses, where the second repeating cycle of poses are different from the first repeating cycle of poses. For example, the second repeating cycle of poses can have a second starting pose, a second ending pose, and a plurality of intermediate poses (e.g., a third transitional pose that are different from the aforementioned first and second intermediate poses) between the second starting pose and the second ending pose. In some implementations, the second starting pose of the second repeating cycle can be the first ending pose of the first repeating cycle, and the second ending pose of the second repeating cycle can be the first starting pose of the first repeating cycle, thereby enabling the quadruped robot to switch between the first gait and the second gait smoothly.

In some implementations, the first gait can have a first step height, and the second gait can have a second step height different from the first step height. For example, the first gait can include a walk mode in which two feet of the quadruped robot contact the ground at the same time, and the second gait can include a crawl mode in which three feet of the quadruped robot contact the ground at the same time, where the crawl mode lowers the step height of the quadruped robot with respect to the walk mode.

The quadruped robot may transition from using the first gait to using the second gait having the second repeating cycle of poses based on one or more of the inferred phenotypic traits of the crops. In some implementations, the one or more inferred phenotypic traits of the crops can be determined onboard (e.g., in situ while the quadruped robot is scouting the field) the quadruped robot. The second gait can also be activated based on the type and arrangement (e.g., terrain conditions) of the field, retrieved from a database or detected by one or more sensors of the quadruped robot.

In some implementations, the operation of the one or more sensors of the quadruped robot can be synchronized with one or more poses of the second repeating cycle of poses of the quadruped robot, to capture one or more alternative sequences of images that depict points-of-interest of the crops. The one or more alternative sequences of images can have a greater resolution (spatial and/or temporal) resolution than the one or more initial sequences of images. For example, the quadruped robot may travel at a slower speed using the second gait than the first gait, so that the one or more initial sequences of images have a lower spatial density of images than the one or more alternative sequence of images.

In some implementations, the one or more of the vision sensors can include a stereo camera adjustable between a first depth and a second depth different from the first depth, based on one or more of the inferred phenotypic traits of the crops. In some implementations, the quadruped robot can include a pulling manipulator and a cutting manipulator, where the cutting manipulator can include a blade to cut a portion of a crop when the portion of the crop exhibits one or more of the inferred phenotypic traits of the crops. The pulling manipulator can transfer the cut portion of the crop to a storage compartment of the crops. Alternatively or additionally, the quadruped robot can include a manipulator that moves foliage of a crop to allow exposure of a previously occluded portion of the crop.

In some implementations, a system may include: a robot, one or more processors included in the robot or in communication with the robot, and memory. The robot can include a plurality of sensors, where the plurality of sensors include one or more vision sensors. The memory stores instructions that, in response to execution of the instructions, cause the one or more processors to: operate the robot to travel a trajectory through a crop field using a first gait, where the first gait can include a first repeating cycle of poses of the robot; synchronize operation of one or more of the vision sensors with one or more poses of the first repeating cycle of poses to capture one or more initial sequences of images depicting one or more points-of-interest of crops growing in the crop field.

The one or more processor can further process the one or more initial sequence of images using one or more phenotypic machine learning models to infer one or more phenotypic traits of the crops. The processing of the one or more initial sequence of images can be performed onboard the robot. The one or more of the inferred phenotypic traits of the crops can include, for example, growth stage (e.g., blooming, etc.) of the crops and growth conditions (e.g., dehydration, disease, leaf color, sizes) of the crops.

In some implementations, the instructions include instructions that cause the one or more processors to: select a second gait for the robot, where the second gait includes a second repeating cycle of poses of the robot that is different from the first repeating cycle of poses of the robot. Such selection can be caused in response to detection of a particular phenotypic trait of the crops from the one or more initial sequences of images. Alternatively, such selection can be caused in response to detection of one or more terrain conditions of the crop field by one or more sensors of the robot. Optionally, such selection can be performed onboard the robot. After selection, the one or more processors can cause the robot to travel along a portion of the trajectory using the second gait.

Optionally, the robot travels slower using the second gait than the first gait, thereby increasing a spatial density of images captured using the one or more vision sensors. Optionally, the first and second gaits have different step heights. Optionally, the robot includes a quadruped robot, the first gait includes a walk mode in which two feet of the quadruped robot contact the ground at the same time, and the second gait includes a crawl mode in which three feet of the quadruped robot contact the ground at the same time.

The instructions may also include instructions to cause the one or more processors to synchronize operation of one or more of the vision sensors with one or more poses of the second repeating cycle of poses of the robot to capture one or more alternative sequences of images of points-of-interest of the crops. Optionally, images of the one or more alternative sequences images have greater spatial resolution than images of the one or more initial sequences of images. Additionally or alternatively, images of the one or more alternative sequences images have greater temporal resolution than images of the one or more initial sequences of images.

In some implementations, the one or more processors can include, for example, central processing unit(s) (CPU(s)), graphics processing unit(s) (GPU(s)), and/or tensor processing unit(s) (TPU(s)) of one or more computing devices, where the one or more processors are operable to execute the above-described and additional instructions stored in associated memory. The instructions stored in the memory are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
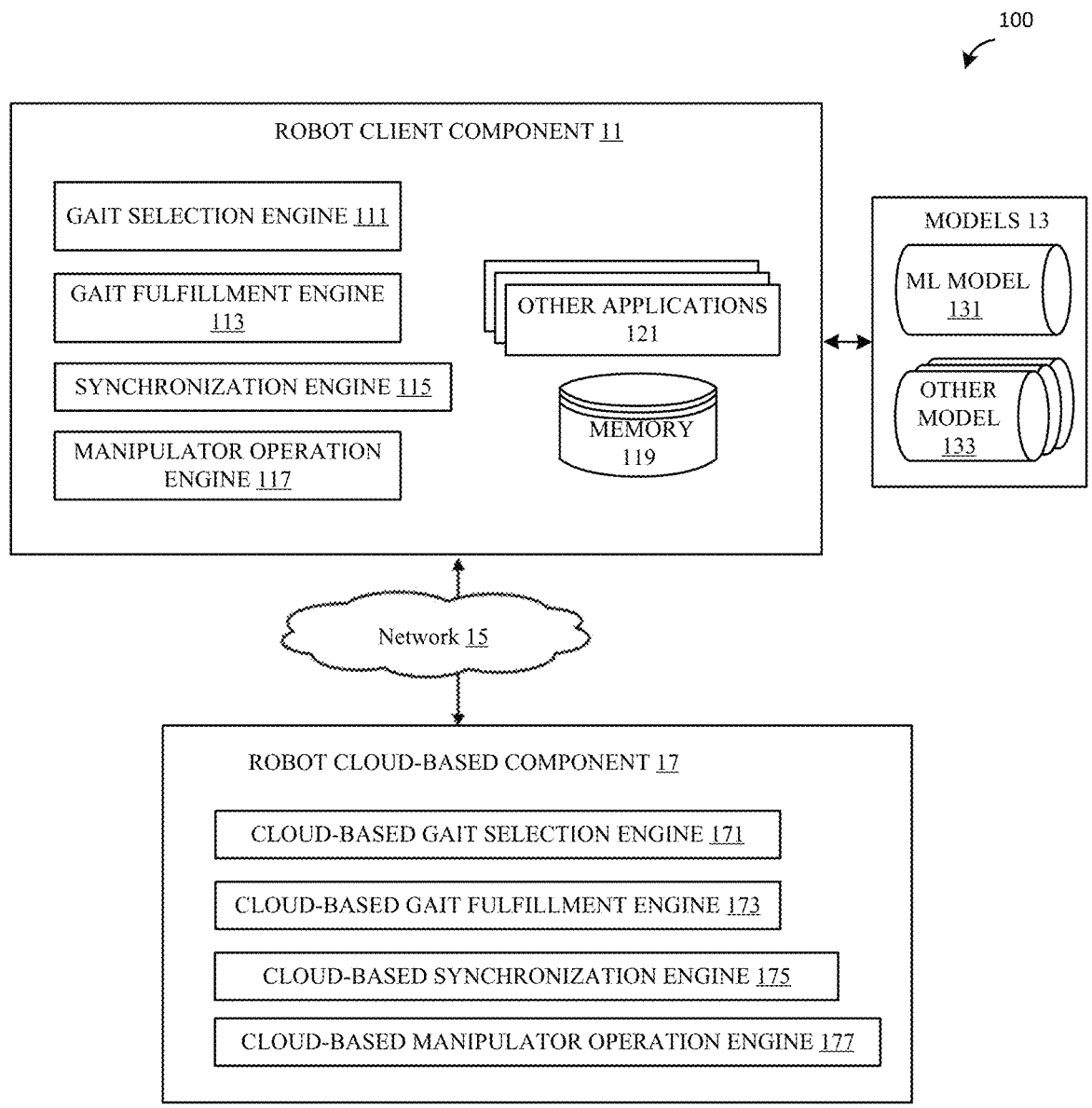
FIG. 1 is a block diagram of an example computing environment in which implementations disclosed herein may be implemented.

For strawberries and other crops, a lot of time and effort may be needed for farmers and scientists to observe the growth conditions of the crops via human scouting. Human scouting, while being a systematic way to observe the health of the crops and identify potential threat of pest outbreaks, is often conducted without examining every plant. Moreover, for workers or farmers having insufficient training or experience in agriculture, or are still in their early stage of planting crops, the quality of human scouting may not be guaranteed given a field having particular types and arrangement of the crops, and/or having a particular terrain of the field that grows the crops.

Implementations are described herein for reducing or eliminating the time and costs associated with performing human scouting of a field to observe and evaluate crop growth. In some implementations, a robot (e.g., legged robot) is operated to travel through a crop field for crop scouting. To perform crop scouting, the robot can be configured to include one or more vision sensors that capture optical images of the crops, one or more thermal sensors that capture thermal images of the crops, and other sensors. The other sensors can include, for example, an electrochemical sensor that detects soil nutrients, a mechanical soil sensor that estimates soil mechanical resistance, a moisture sensor that detects the soil moisture, a location sensor that collects positioning data of the crops as well as the associated timing data, and/or a Light detecting and ranging (LiDAR) sensor that identifies the crops.

In some implementations, the robot can carry one or more of the aforementioned sensors (e.g., vision sensors) and be operated to travel along a trajectory predefined based on a type and arrangement of the crop field. Based on a type and size of crops grown in the crop field as well as a terrain of the crop field, the robot can be configured to have one or more particular gaits while traveling along the trajectory through the crop field. The one or more particular gaits can include, for example, a first gait that includes a walk mode and a second gait that includes a crawl mode. When the robot is a quadruped robot, the walk mode of the quadruped robot can be a mode in which two feet (e.g., front left and back right, front right and back left) contact the ground at the same time, and the crawl mode can be a mode in which three feet of the quadruped robot contact the ground at the same time. In some implementations, the quadruped robot can be operated to travel a portion of the trajectory using the second gait. For example, when the quadruped robot detects an abnormal growth condition of a crop, the quadruped robot can transition from the first gait to the second gait to capture images with higher resolution. This example, however, is not intended to be limiting.

In some implementations, the first gait can include a first repeating cycle of poses of the robot, and the second gait can include a second repeating cycle of poses of the robot. In some implementations, operation of the one or more vision sensors can be synchronized with one or more poses of the robot from the first repeating cycle, to capture an initial sequence of images of a first point-of-interest of the crops. The initial sequence of images may be processed to determine one or more phenotypic traits of the crops (e.g., dehydrated, having pests, yellow leaves, flowering, etc.). In some implementations, if a particular phenotypic trait (e.g., dehydration, abnormal shape of the crops) is detected by the robot for the crops, the robot can transition from the first gait to the second gait to travel along a portion of the trajectory or an alternative path that temporally deviates from the trajectory, to capture an alternative sequence of images of the first point-of-interest of the crops. The alternative sequence of images can have a higher resolution than the initial sequence of images, to provide richer and clearer information of the crops. However, implementations are not limited thereto, and more details are provided hereinafter with reference to the figures and other implementations.

The illustrative implementations described herein are not meant to be limiting, and the features illustrated in each of the figures may be used in combination with one another. Thus, the figures should be generally viewed as component aspects of one or more overall implementations, with the understanding that not all illustrated features are necessary for each implementation. Additionally, any enumeration of elements, blocks, or steps in this specification or the claims is for purposes of illustration. Thus, such enumeration should not be interpreted to require or imply that these elements, blocks, or steps adhere to a particular arrangement or are carried out in a particular order.

FIG. 1 is a block diagram of an example computing environment in which implementations disclosed herein may be implemented. As shown in FIG. 1, a computing system 100 for a robot (e.g., legged robot) can include a robot client component 11 accessible by the robot locally (i.e., with or without a network connection). The robot can be a multi-legged robot or other applicable type of robot that carries one or more sensors for observing an environment surrounding the robot. The robot client component 11 can include one or more local engines. For example, as illustrated in FIG. 1, the robot client component 11 of the robot can include a gait selection engine 111, a gait fulfillment engine 113, and a synchronization engine 115.

The gait selection engine 111 can be configured to select a gait from a plurality of gaits available to the robot to travel through a crop field. In some implementations, the gait selection engine 111 can select the first gait (e.g., a walking gait) from the plurality of gaits based on a type, terrain condition, and arrangement of the crop field (e.g., a field having flat ground that grows corn) for the robot to travel through a trajectory through the crop field. The trajectory can be predefined depending on the size and arrangement of the crop field to be scouted. In some implementations, the gait selection engine 111 can select a first traveling speed when the robot is operated in the first gait.

The gait fulfillment engine 113 can be configured to, after the gait selection engine 111 selects the first gait for the robot to travel through the crop field, retrieve commands from memory 119 to control one or more actuators of the robot to operate the robot in the first gait, where the first gait includes the first repeating cycle of poses of the robot.

The synchronization engine 115 can be configured to synchronize operation of the one or more sensors carried by the robot and one or more poses in the first repeating cycle of poses of the robot. There may be a variety of different reasons to synchronize sensors with poses in this way. It may be desirable to ensure that a particular camera acquires images at a uniform height and/or angle. If that camera is mounted to the robot such that it is moved up and down dramatically by the robot's gait, then the camera may be operated to capture images at the same point during each cycle of poses of the gait, e.g., to increase the likelihood that the resulting images are relatively uniform, capture the same general regions of different plants, etc. As another example, the robot may experience variable levels of vibration throughout its gait. Capturing images during periods of relatively high vibration may introduce noise into the images, which is not ideal for purposes of phenotypic ML processing. Accordingly, the vision sensor may be operated deliberately during relatively low-vibrational periods of the cycle of poses associated with a gait, e.g., when two feet have been firmly planted on the ground for some given time interval.

As a descriptive example, the first repeating cycle of poses can include a first pose and a second pose, and the synchronization engine 115 can synchronize the first pose of the robot with operation (e.g., turn on) of a vision sensor, of the one or more sensors, by controlling or operating the vision sensor to capture an image of the crop field whenever the robot is in the first pose, thereby generating an initial sequence of images. Alternatively, the synchronization engine 115 can synchronize the first and second poses of the robot with operation of the vision sensor. Optionally or alternatively, the one or more sensors can include a first vision sensor and a second vision sensor, and the synchronization engine 115 can synchronize the first pose of the robot with operation of the first vision sensor, and/or synchronize the second pose of the robot with operation of the second vision sensor.

In some implementations, the robot client component 11 can include, or otherwise access, one or more models 13, where the one or more models 13 can include one or more machine learning (ML) models 131 and one or more other models 133. The one or more ML models 131 are trained to process the initial sequence of images, to infer (e.g., estimate, predict) one or more phenotypic traits of the crops captured in the initial sequence of images. In some implementations, when the robot client component 11 (or a robot cloud-based component 17 that will be introduced later) detects a particular phenotypic trait (e.g., a plant disease) of the crops using the one or more ML models 131, the gait selection engine 111 can select a second gait for the robot from the plurality of poses available to the robot and the gait fulfillment engine 1113 can transition the robot from the first gait to the second gait so that the robot travels along a portion of the trajectory using the second gait.

The second gait can be, for example, a crawling gait that enables the robot to move at a second speed much slower than the first speed, so that the robot travels through the crop field along the trajectory with enhanced stability. The synchronization engine 115 can synchronize operation of the one or more sensors carried by the robot with one or more poses from a second repeating cycle of poses of the robot in the second gait. Because the robot travels in the second gait with slower speed, the one or more sensors may capture images of the crops (or a point-of-interest) appearing without blur. Such images may form one or more alternative sequences of images.

Optionally, the robot client component 11 of the robot can further include a manipulator operation engine 117 configured to, when the robot is equipped with one or more manipulators, selectively operate the one or more manipulators to perform one or more actions (e.g., crop-observing action or environmental factor testing action). For example, the one or more manipulators can include a pair of manipulators having a cutting manipulator and a fetching manipulator. In this example, the manipulator operation engine 117 can be configured to operate the cutting manipulator to cut a portion (e.g., leaf, stem, fruit) of a plant that grows in the crop field, and/or operate the fetching manipulator to fetch and transfer the cut portion to a storage compartment that the robot carries. As another example, the one or more manipulators can include a pulling manipulator, and the manipulator operation engine 117 can be configured to operate the pulling manipulator to remove certain objects (weeds that hide the root of the crops, or healthy branches of a crop that block infested leaves of an unhealthy plant) from a field of view of the robot, to reveal a point-of-interest that the robot want to observe more closely.

As a further example, the one or more manipulators can include a sensor manipulator that holds a sensor, where the sensor manipulator can be rotatable and extendable. In this example, the manipulator operation engine 117 can be configured to operate (e.g., rotate and/or extend) the sensor manipulator to place the sensor in a desired position with a desired orientation, so as to sense one or more points-of-interest in the surrounding environment of the robot. The sensor manipulator can be, for example, a robot head coupled to a body of the robot, where the robot head includes one or more LiDAR sensors to detect objects surrounding the robot. The sensor manipulator can also be coupled to the robot at other regions (e.g., on the back of the robot, below the robot, on the side of the robot, at the end of the robot, etc.) and can include other sensors (thermal, mechanical, electrochemical, electric, magnetic, etc.), and the descriptions herein are not intended to be limiting.

Optionally, the robot client component 11 can communicate with a robot cloud-based component 17 via a network 15. The cloud-based component 17 can include a cloud-based gait selection engine 171, a cloud-based gait fulfillment engine 173, and a cloud-based synchronization engine 175. The cloud-based gait selection engine 171 can be a counterpart of the gait selection engine 111, having similar functions but generally a higher processing speed. The cloud-based gait fulfillment engine 173 can be a counterpart of the gait fulfillment engine 113, having similar functions but generally a higher processing speed. The cloud-based synchronization engine 175 can be a counterpart of the synchronization engine 115, having similar functions but generally a higher processing speed. Repeated descriptions of the functions of aforementioned cloud-based components (e.g., cloud-based gait selection engine) are omitted and not provided herein.

Figure 2A:
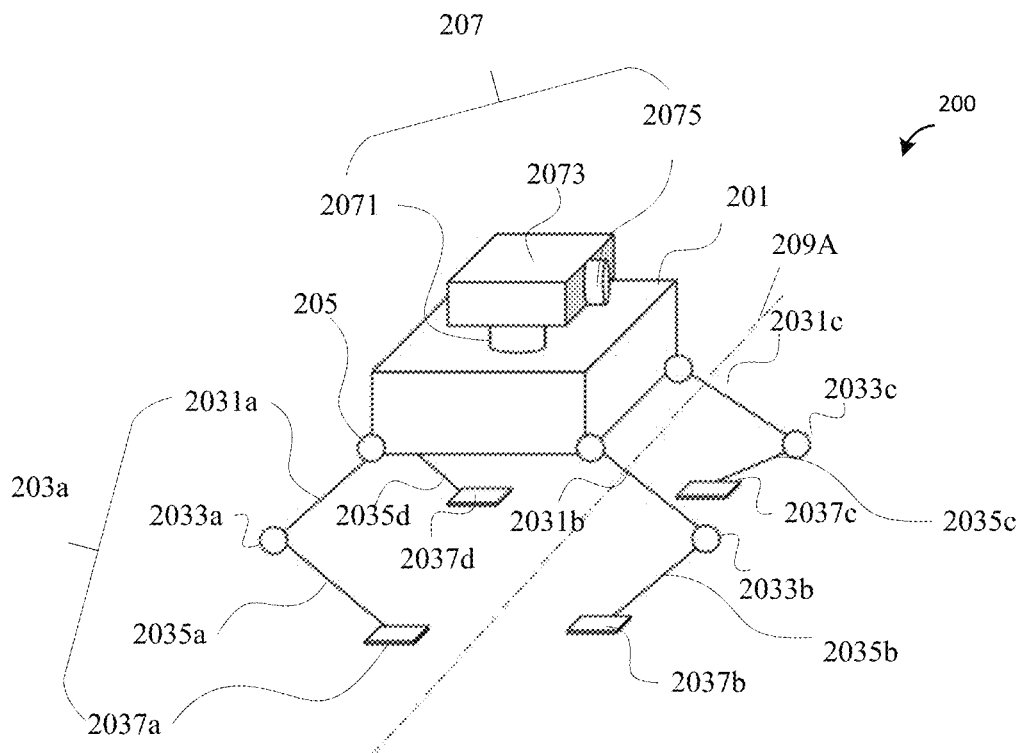
FIG. 2A illustrates an example legged robot walking in a first path using a first gait, for practicing certain aspects of the present disclosure, in accordance with various implementations.

FIG. 2A illustrates an initial pose (e.g., all-feet pose) of a legged robot 200 walking along a first trajectory using a first gait (e.g., a walking gait), for practicing certain aspects of the present disclosure, in accordance with various implementations. As shown in FIG. 2A, the legged robot 200 can have a body 201 and one or more legs (see, for example, left front leg 203a). The body 201 can be configured to have a structure that balances the legged robot 200. The body 201 can also be configured to power the legged robot 200, and/or carry one or more environmental sensors (e.g., a LiDAR sensor, not shown in FIG. 2A) that sense an environment (e.g., obstacle, temperature, humidity) of the legged robot 200. The one or more legs can be coupled to the body 201, for example, via one or more first connectors 205, which can be actuators or joints.

As a non-limiting example, the left front leg 203 a (left from the perspective of the reader, not the robot) of the four legs shown in FIG. 2A can include a first portion 2031 a and a second portion 2035 a coupled to the first portion 2031 a. The second portion 2035 a can be rotatably coupled to the first portion 2031 a via a second connector 2033 a, where the second connector 2033 a can be different from the first connectors 205 (or substantially the same as one of the first connectors 205). The left front leg 203 a of the robot 200 can further include a foot 2037 a for contacting the ground, where the foot 2037 a is coupled to the second portion 2035 a. Optionally, the one or more legs (e.g., the left front leg 203 a) can further carry one or more sensors, such as a humidity sensor (not shown) or a temperature sensor (not shown).

In some implementations, as shown in FIG. 2A, in addition to the left front leg 203a, the one or more legs can include a right front leg (right from the perspective of the reader, not the robot) having a first portion 2031b, a second portion 2035b, a second connector 2033b that couples the first portion 2031b to the second portion 2035b, and a foot 2037b coupled to the second portion 2035b. The one or more legs can further include a left rear leg having a first portion (not shown from this viewing angle), a second portion 2035d, a second connector (not shown) that couples the first portion to the second portion 2035d, and a foot 2037d coupled to the second portion 2035d. The one or more legs can further include a right rear leg having a first portion 2031c, a second portion 2035c, a second connector 2033c that couples the first portion 2031c to the second portion 2035c, and a foot 2037c coupled to the second portion 2035c.

The first portion for each of the one or more legs can have six degrees of freedom (i.e., a position defined using x-, y-, and z-axis, as well as an orientation defined using pitch, yaw and roll angles). The second portion for each of the one or more legs can have six degrees of freedom (i.e., a position defined using x-, y-, and z-axis, as well as an orientation defined using pitch, yaw and roll angles). As a non-limiting example, some of the first portions (e.g., 2031a and 2031c) can have approximately the same orientation at certain points of time; however, different first portions can have different positions and orientations at other points of time. Similarly, some of the second portions (e.g., 2035a and 2035c) can have approximately the same orientation at certain points of time; however, different second portions can have different positions and orientations at other points of time. Such configuration of the one or more legs may allow a high-level of flexibility, thereby adapting the legged robot 200 to have different gaits (e.g., running, walking, crawling, sidestepping, standing, rotating, etc.). The legged robot 200 can walk on flat ground or climb a slope, or even walk or run at a controllable speed that can vary as a function of time. The legged robot 200 can select, for example based on terrain conditions of the crop field, one or more of such gaits to walk through the crop field. In some implementations, due to the one or more legs being flexible, the legged robot 200 may move forward, backward or diagonally, or sideways (mimic a crab).

In some implementations, the position and the orientation of the first portion 2031a of the left front leg 203a of the legged robot 200 can be controlled by one or more processors (e.g., via the first connector 205 that couples the first portion 2031a of the left front leg 203a to the legged robot 200), under instructions stored in a memory of the legged robot 200 or under instructions received from a user via a network connection. In some implementations, the position and the orientation of the second portion 2035a of the left front leg 203a of the legged robot 200 can be controlled by the one or more processors (e.g., via the second connector 2033a that couples the second portion 2035a of the left front leg 203a to the first portion 2031a of the left front leg 203a), under instructions stored in the memory of the legged robot 200 or under instructions received from the user. Optionally, the first connector 205a, the first portion 2031a, and the second connector 2033a of the left front leg 203a of the legged robot 200 can be controlled to cooperatively lift the foot 2037a of the left front leg 203a off the ground, move the foot 2037a in a predetermined direction for a certain distance, and lower the foot 2037a to touch the ground, thereby completing a movement step of the left front leg 203a.

Figure 2B:
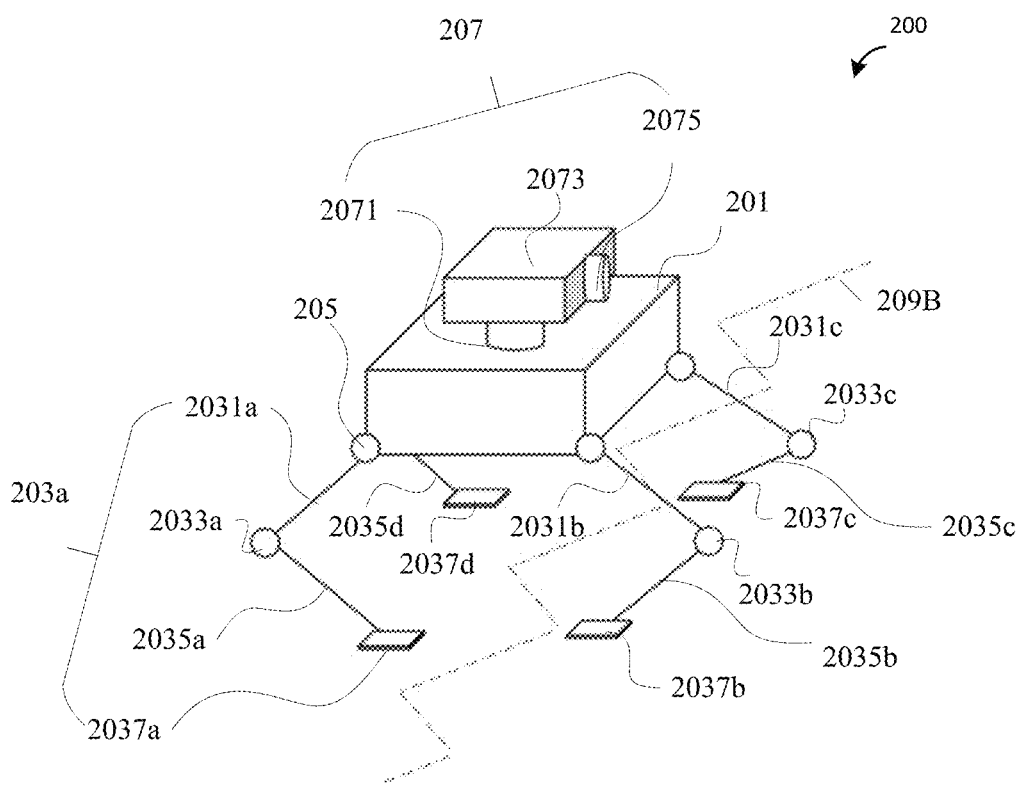
FIG. 2B illustrates an example legged robot walking in a second path using the first gait, for practicing certain aspects of the present disclosure, in accordance with various implementations.

Optionally or additionally, for each of the one or more legs (e.g., the left front leg 203a) in FIG. 2A, the foot (e.g., the foot 2037a of the left front leg 203a) can be coupled to the second portion (e.g., the second portion 2035a of the left front leg 203a) via a third connector ("third actuator", not shown) so that the position and orientation of the foot (e.g., the foot 2037a) can be controlled precisely using the third connector, to adapt to the terrain of the crop field. However, the third connector may not be necessary and may be omitted to simplify a design and the control of the legged robot 200. The feet of the one or more legs can have a structure designed based on the terrain condition (e.g., soil condition, surface) of the crop field. For example, the feet of the one or more legs pictured in FIG. 2A can be removable and replaced with ones having a different structure selected based on the terrain condition of the crop field. Having the feet of the one or more legs being adjustable and customizable can allow the legged robot 200 to travel through different terrain conditions of the crop field. In some implementations, the one or more legs can be operated to move the legged robot 200 along a predefined trajectory (e.g., a first trajectory 209A in FIG. 2A, or a second trajectory 209B in FIG. 2B), where the predefined trajectory can be determined based on factors including: (1) the type of crops to be scouted, and (2) the size, crop arrangement, and terrain conditions of the crop field that grows the crops to be scouted.

In various implementations, the legged robot 200 can further include a sensing structure 207 coupled to the body 201, where the sensing structure 207 can be removable and designed in a shape/configuration based on user's need or task. As a non-limiting example, the sensing structure 207 can be attached to a top surface of the body 201 for capturing one or more images of the crops to be scouted. In some other implementations, the sensing structure 207 can be attached to a bottom surface or a side surface of the body 201, and the disclosure is not limited thereto. As a non-limiting example, referring to FIG. 2A, the sensing structure 207 can include a first manipulator 2071, a sensor-carrying platform 2073, and one or more sensors 2075. The first manipulator 2071 can be configured to couple the sensor-carrying platform 2073 to the body 201, and can be rotatable to rotate the sensor-carrying platform 2073. In some implementations, the sensor-carrying platform 2073 can be omitted, and the one or more sensors 2075 can be coupled to the first manipulator 2071 directly. It's noted that a configuration of the first manipulator 2071 is for the purpose of illustrations only and may have other configurations when appropriate.

In some implementations, the one or more sensors 2075 can include a vision sensor disposed on a side (e.g., right side in FIG. 2A) of the sensor-carrying platform 2073 to capture images of the crops that grow on the right side of the first trajectory 209A. In some implementations, the one or more sensors 2075 can include a pair of vision sensors disposed on two opposite sides (e.g., left and right sides) of the sensor-carrying platform 2073 to capture images of the crops that grow on two sides of the first trajectory 209A. The number, type, position, and configuration of the one or more sensors 2075 are not limited to descriptions herein, and can be adjusted based on specific user needs or the scouting task. For example, the one or more sensors 2075 can include a LiDAR sensor attached to a front side of the sensor-carrying platform 2073 (alternatively, to a front side of the body 201, or to a top surface of the sensor-carrying platform 2073), where the LiDAR sensor is orientated in a direction approximately the same as a moving direction of the legged robot 200 along the first trajectory 209A. This allows the LiDAR sensor to detect and identify obstacles while the legged robot 200 travels along the first trajectory 209A. In this example, if the LiDAR sensor detects a rock that blocks the legged robot 200 from traveling along the first trajectory 209A, the legged robot 200 may detour the first trajectory 209A temporally to bypass the obstacle, and after bypassing, the legged robot 200 can continue traveling along the rest portion of the first trajectory 209A.

Figure 2C:
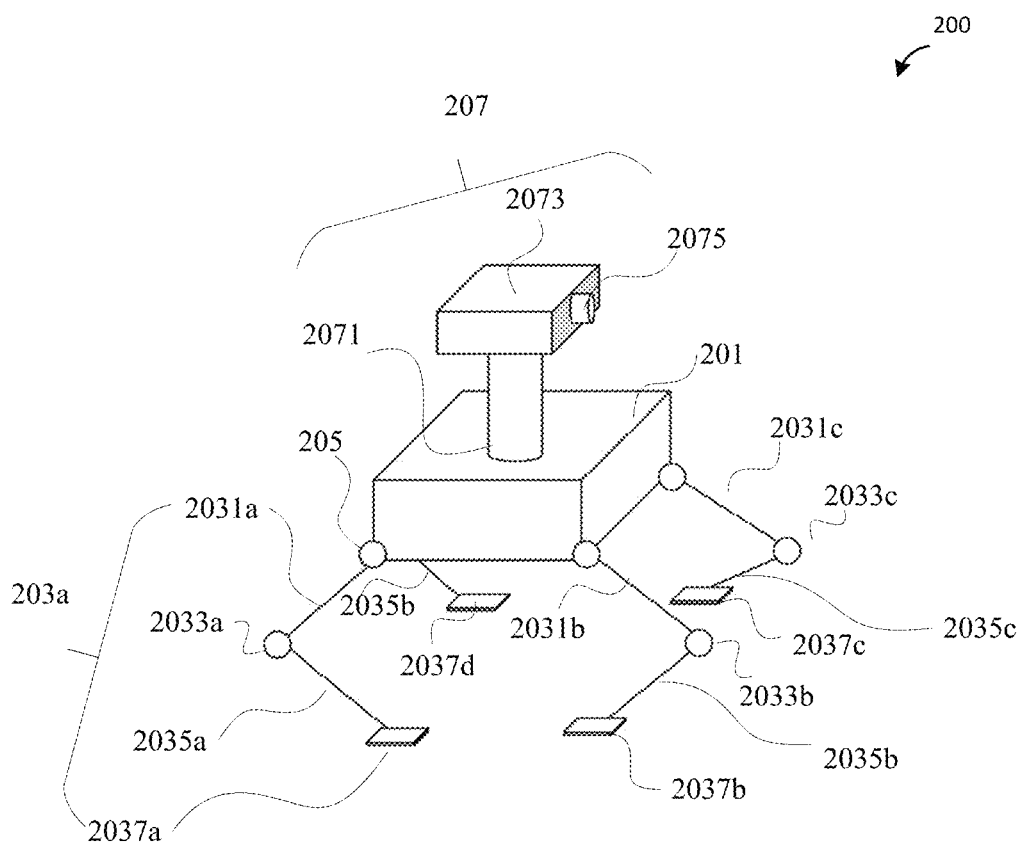
FIG. 2C illustrates an example legged robot with a manipulator extended upwards to capture one or more images, for practicing certain aspects of the present disclosure, in accordance with various implementations.

In some implementations, the first manipulator 2071 can be rotatable and/or extendable. For example, the first manipulator 2071 can rotate a certain degree (e.g., approximately 90 degrees to the right) so that the one or more sensors can respectively have a different orientation to observe a different aspect of the surrounding environment. As another example, referring to FIG. 2C, the first manipulator 2071 can extend upwards to raise the sensor-carrying platform 2073 at one or more proper heights, so that the one or more sensors 2075 (e.g., vision sensors) can capture images of one or more points-of-interest of the crops.

Figure 2D:
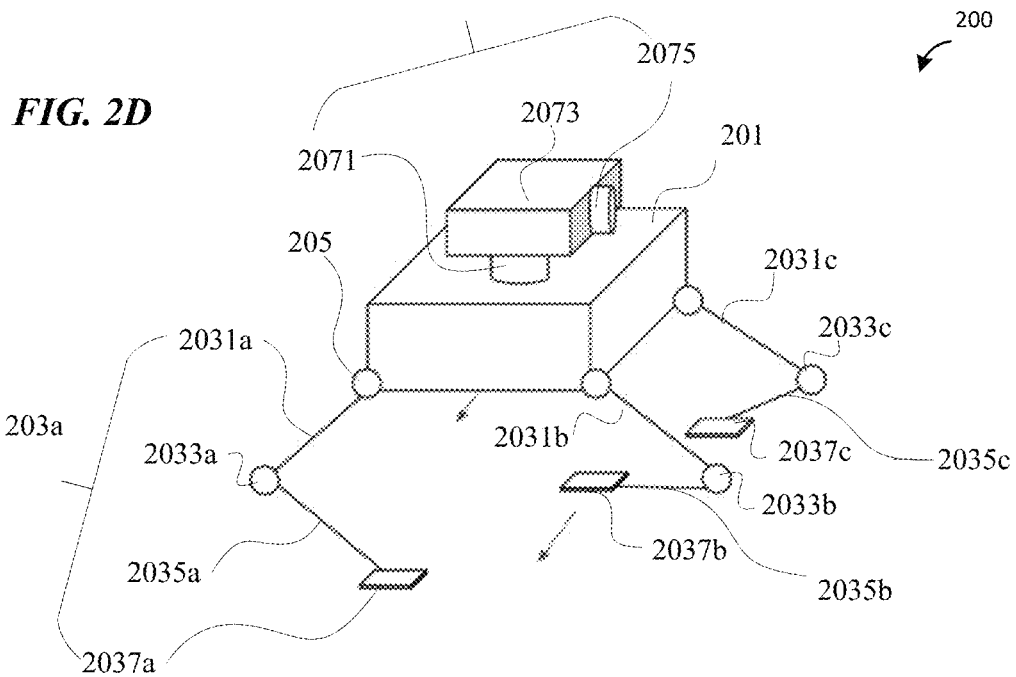
FIG. 2D illustrates an example legged robot having a first pose of the first gait, for practicing certain aspects of the present disclosure, in accordance with various implementations.
Figure 2E:
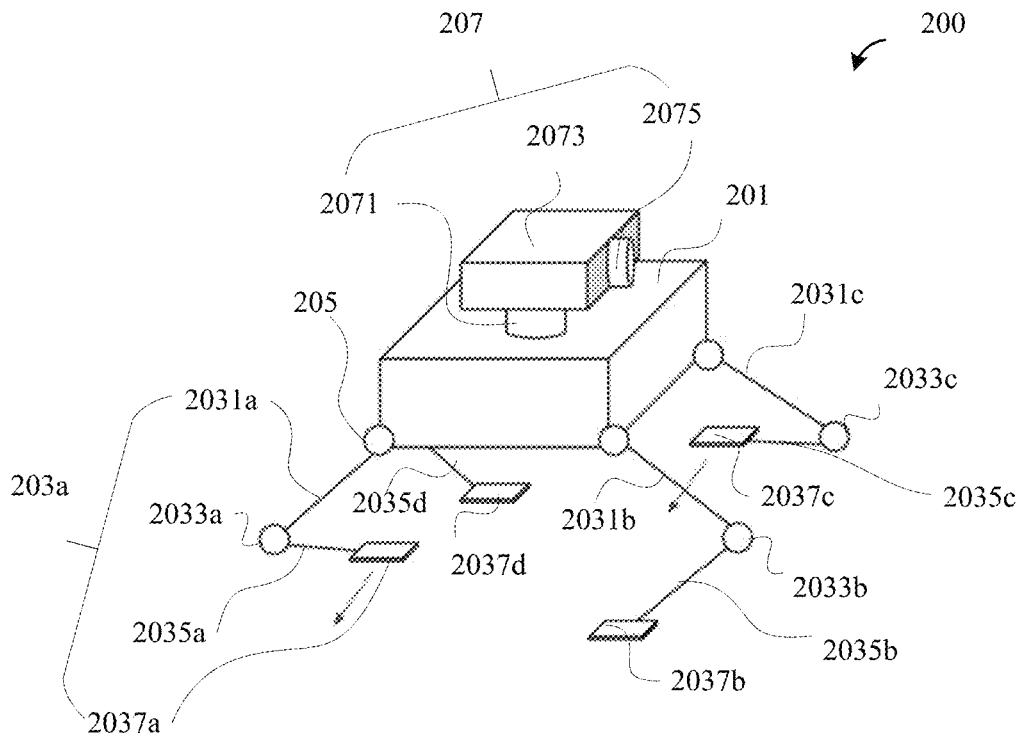
FIG. 2E illustrates an example legged robot having a second pose of the first gait, for practicing certain aspects of the present disclosure, in accordance with various implementations.

FIG. 2D illustrates an example of a legged robot having a first pose of the first gait, for practicing certain aspects of the present disclosure, in accordance with various implementations. FIG. 2E illustrates an example of a legged robot having a second pose of the first gait, for practicing certain aspects of the present disclosure, in accordance with various implementations. The first pose, and the second pose here may or may not refer to a configuration of the legged robot 200. As shown in FIG. 2D, the legged robot 200, in the first gait, can have a first pose in which the foot 2037a of the left front leg 203a of the legged robot 200 and the foot 2037c of the right rear leg contact the ground at approximately the same time while the foot 2037b of the right front leg and the foot of the left rear leg are lifted off the ground maximally at approximately the same time. After being lifted off the ground, the foot 2037b of the right front leg and the foot of the left rear leg can be configured to move forward in a predefined direction (indicated by two straight line arrows in FIG. 2D) so that the legged robot 200 is operated to travel through the crop field along a predefined trajectory.

Referring to FIG. 2E, the legged robot 200, in the first gait, can have a second pose in which the foot 2037a of the left front leg 203a of the legged robot 200 and the foot 2037c of the right rear leg are lifted off the ground maximally at approximately the same time while the foot 2037b of the right front leg and the foot 2037d of the left rear leg remain in contact with the ground at approximately the same time. After being lifted off the ground, the foot 2037a of the left front leg 203a of the legged robot 200 and the foot 2037c of the right rear leg can move forward in a direction (e.g., indicated by two straight line arrows in FIG. 2E) so that the legged robot 200 is operated to travel through the crop field along the predefined trajectory. The first pose and the second pose can be repeated in the order, thereby forming a first repeating cycle of poses for the legged robot 200 to travel through the crop field using the first gait.

Optionally, when a pair of feet (e.g., the pair of feet 2037a and 2037c, or the pair of feet 2037b and 2037d) are gradually lifted off the ground while the other pair of the feet remain in contact with the ground, the height of the body 203 can remain substantially the same. Alternatively, when a pair of feet (e.g., the pair of fet 2037a and 2037c, or the pair of feet 2037b and 2037d) are gradually lifted off the ground while the other pair of the feet remain in contact with the ground, the one or more legs (e.g., the four legs in FIG. 2D or FIG. 2E) may gradually alter their configuration (via computer programming), which causes the body 203 to be gradually raised from an original height of the body 203 in the all-feet pose of the first gait (see FIG. 2A) to reach a maximal height. In this case, when the pair of feet (e.g., the pair of feet 2037a and 2037c) lifted to a highest possible position are gradually lowered to contact the ground, the one or more legs may gradually alter their configuration which causes the body 203 to be gradually lowered from the maximal height to the original height of the body 203 in the all-feet pose of the first gait. Accordingly, when the first pose and the second pose are repeated to form the first repeating cycle of poses for the legged robot 200 to travel through the crop field using the first gait, the height of the body 203 of the legged robot 200 may show repeated up-and-down, varying as a function of time.

In some implementations, operation of the one or more sensors 2075 can be synchronized with one or more poses (e.g., the first pose, the second pose, and/or other poses) of the first repeating cycle to capture one or more initial sequences of images that depict one or more points-of-interest of crops growing in the crop field. The one or more initial sequence of images may be processed using one or more phenotypic machine learning models respectively trained to recognize a corresponding phenotypic trait of the crops, to infer one or more phenotypic traits of the crops.

When the legged robot 200 detects a triggering event (e.g., detection of a phenotypic trait, such as pest disease or abnormal size of the crop, or change in the terrain condition of the crop field such as a change from flat ground to a slope), the legged robot 200 may be configured to transition from the first gait to a second gait, where the second gait can be selected from a plurality of robot gaits (a different walking gait, a jumping gait, a dancing gait, a running gait, a crawling gait, etc.) based on the triggering event. The triggering event can be detected instantly by the legged robot 200. For example, one or more processors of the legged robot 200 can instantly process one or more initial sequence of images captured by the one or more sensors 2075 when the legged robot 200 travels using the first gait, by accessing and using one or more trained phenotypic machine learning models stored locally (or remotely, in case there is network connection).

In response to such detection of the triggering event, the legged robot 200 can be operated to travel, using the second gait that is different from the first gait, along a portion of the trajectory, or along a temporal path that temporally detours the trajectory, to capture higher-resolution images of the crops for detailed or more comprehensive analysis of the pest disease. The legged robot 200 can travel at different speeds using different gaits. For example, the legged robot 200 can be programmed to travel at a first speed in the first gait (e.g., first walking gait) and to travel at a second speed in the second gait (e.g., crawling gait), where the first speed is faster than the second speed.

Figure 2F:
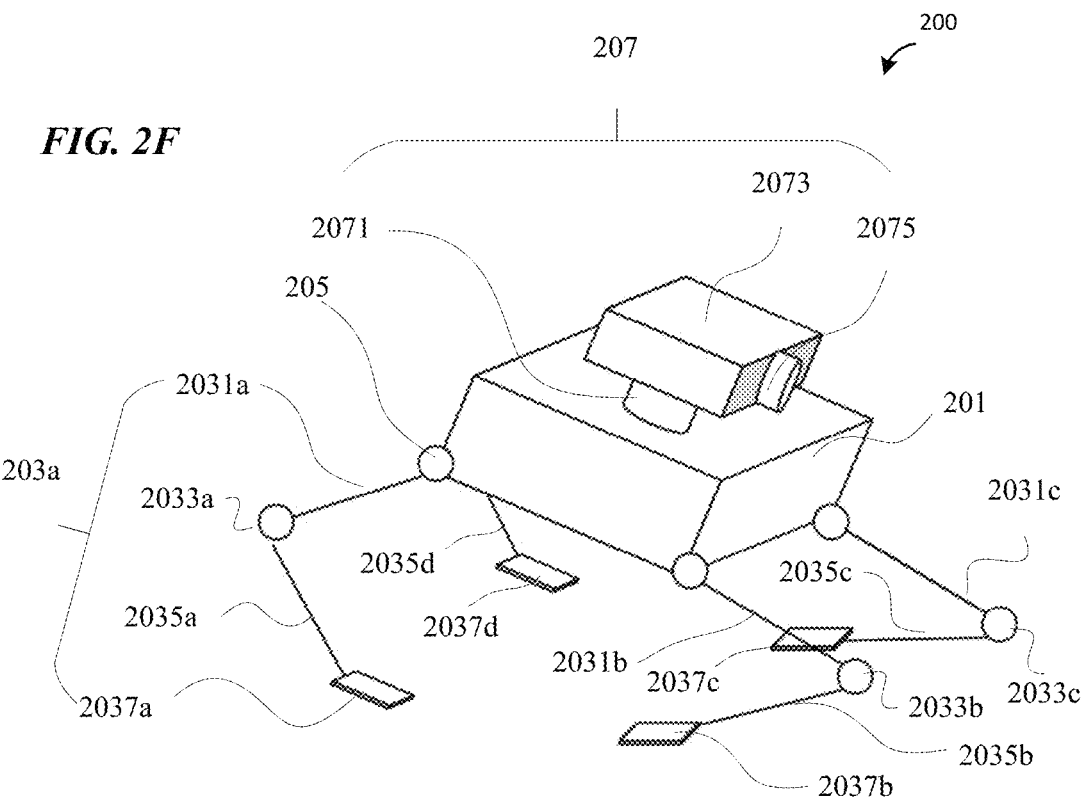
FIG. 2F and FIG. 2G illustrate an example of a legged robot walking using a second gait, for practicing certain aspects of the present disclosure, in accordance with various implementations.
Figure 2G:
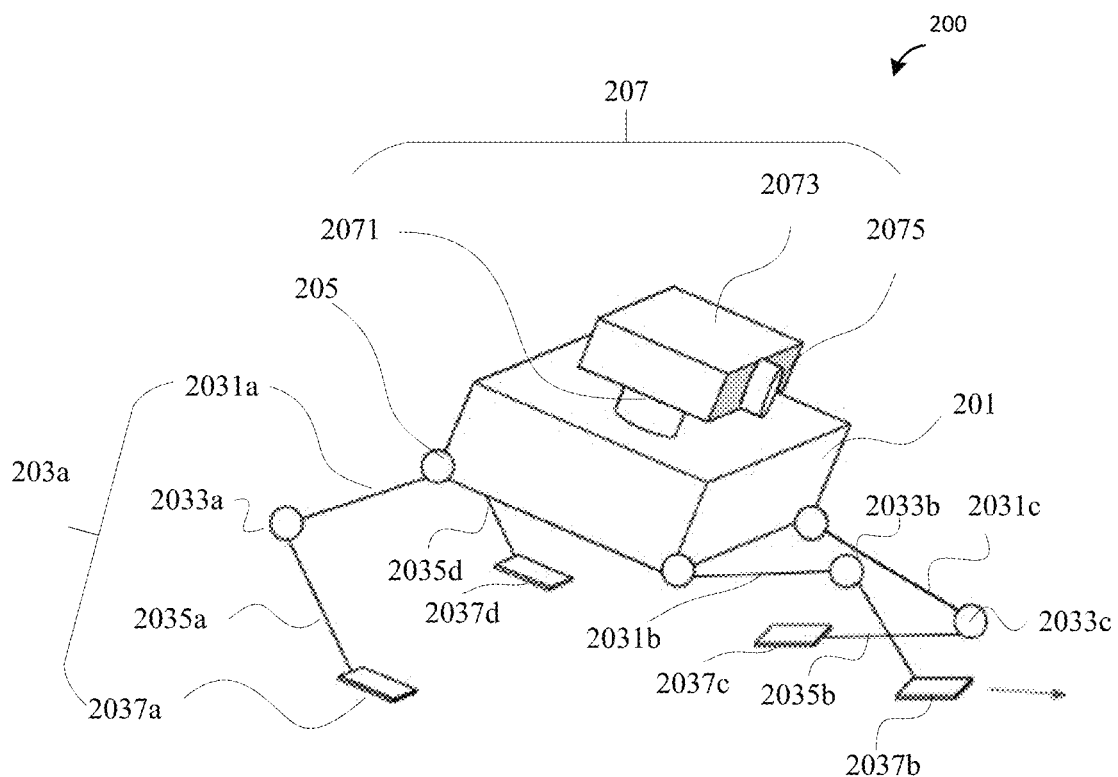

FIG. 2F and FIG. 2G illustrate an example of a legged robot walking using the second gait (e.g., crawling gait), for practicing certain aspects of the present disclosure, in accordance with various implementations. As shown in FIG. 2F and with reference to FIG. 2A, when the legged robot 200 detects a triggering event such as plant disease in the crops, the legged robot 200 may pause traveling along a predefined trajectory (e.g., the first trajectory 209A in FIG. 2A) by transitioning into an all-feet pose of the first gait, and the legged robot 200 may further transition from the all-feet pose of the first gait in FIG. 2A into an initial pose (e.g., all-feet pose) of the second gait illustrated in FIG. 2F. In the initial pose of the second gait, the legged robot 200 can have a pair of legs (e.g., right front leg and right rear leg) lowered to mimic dog crawling and to lower a center of gravity. Optionally or alternatively, the legged robot 200 can have all legs lowered to further lower the center of gravity for better stability that prevents the images captured by the one or more sensors 2075 from getting blurred due to bad focus of the one or more sensors 2075.

In some implementations, as shown in FIG. 2F, the body 201 of the legged robot 200 may be tilted in the initial pose of the second gait, so that a vision sensor of the one or more sensors 2075 carried by the sensor-carrying platform 2073 that is coupled to the body 201 via the first manipulator 2071 moves closer to a point-of-interest of the crops (e.g., a root region of the crops providing relevant crop information for the plant disease). Optionally or additionally, the body 201 of the legged robot 200 is tilted so that the vision sensor configured to capture an image of the point-of-interest of the crops can have a desired orientation with respect to the point-of-interest.

In some implementations, the legged robot 200 can be configured to, in the second gait, have a second repeating cycle of poses that move the legged robot 200 closer to the point-of-interest, to capture better images and/or to perform other observing actions. The other observing actions may include, for example, a soil condition observation or a leaf condition observation. For example, the legged robot 200 can include, in addition to the first manipulator 2071, a pulling manipulator (not shown), a cutting manipulator (not shown), and/or a fetching manipulator. The cutting manipulator can include a blade to cut a portion (e.g., root, leaves, branch) of the crops. The pulling manipulator can transfer the cut portion to a storage compartment (not shown) of the legged robot 200.

In some implementations, when the point-of-interest requiring closer observation by the legged robot 200 is occluded or partially occluded by objects such as weeds (or foliage from an adjacent plant), the pulling manipulator can pull away or manipulate such objects so that the point-of-interest is no longer occluded by the objects. Optionally or additionally, the legged robot 200 can include a sensor manipulator (not shown) to transfer a sensor (e.g., PH meter) carried by the legged robot 200 to the point-of-interest to measure one or more environmental parameters (e.g., PH value of the soil), and to retrieve the sensor after the one or more environmental parameters are determined. Such sensor can be stored in the storage compartment and used for subsequent observation when necessary.

FIG. 2G illustrates an example of a legged robot walking using the second gait (e.g., crawling gait), for practicing certain aspects of the present disclosure, in accordance with various implementations. Referring to FIG. 2G, in addition to the initial pose, the second gait can include a first pose in which, the foot of a first leg (e.g., the right front foot 2037 b) is lifted off the ground to move forward (e.g., in a direction indicated by the arrow in FIG. 2G) while the other three feet (e.g., the left front foot 2037 a, the left rear foot 2037 d, and the right rear foot 2037 c) contact the ground. The second gait can further include a second pose in which the foot of a second leg (e.g., the left rear foot 2037 d) is lifted off the ground to move forward while the other three feets contact the ground, a third pose in which the foot of a third leg (e.g., the right rear foot 2037 c) is lifted off the ground to move forward while the other three feet contact the ground, and a fourth pose in which the foot of a fourth leg (e.g., the left front foot 2037 a) is lifted off the ground to move forward while the other three feets contact the ground. The first, second, third, and fourth poses may be repeated in a certain order, thereby forming the second repeating cycle of poses. However, the second repeating cycle of poses is not limited thereto and is for the purpose of illustrations only. The position and orientation of the body 201 can remain the same or have up-and-downs as the legged robot 200 travels the crop field using the second gait.

In some implementations, operation of one or more of the vision sensors 2075 may be synchronized with one or more poses in the second repeating cycle of poses, or vice versa, to capture one or more alternative sequences of images. The one or more alternative sequences of images can have greater spatial resolution than images from the one or more initial sequences of images. In this case, the one or more vision sensors 3075 may include a first vision sensor that is configured to switch between a first spatial resolution and a second spatial resolution. Optionally, the one or more vision sensors 3075 can include a stereo camera, adjustable between a first depth and a second depth that is different from the first depth, where the adjustment can be based on one or more of the inferred phenotypic traits of the crops.

Figure 3:
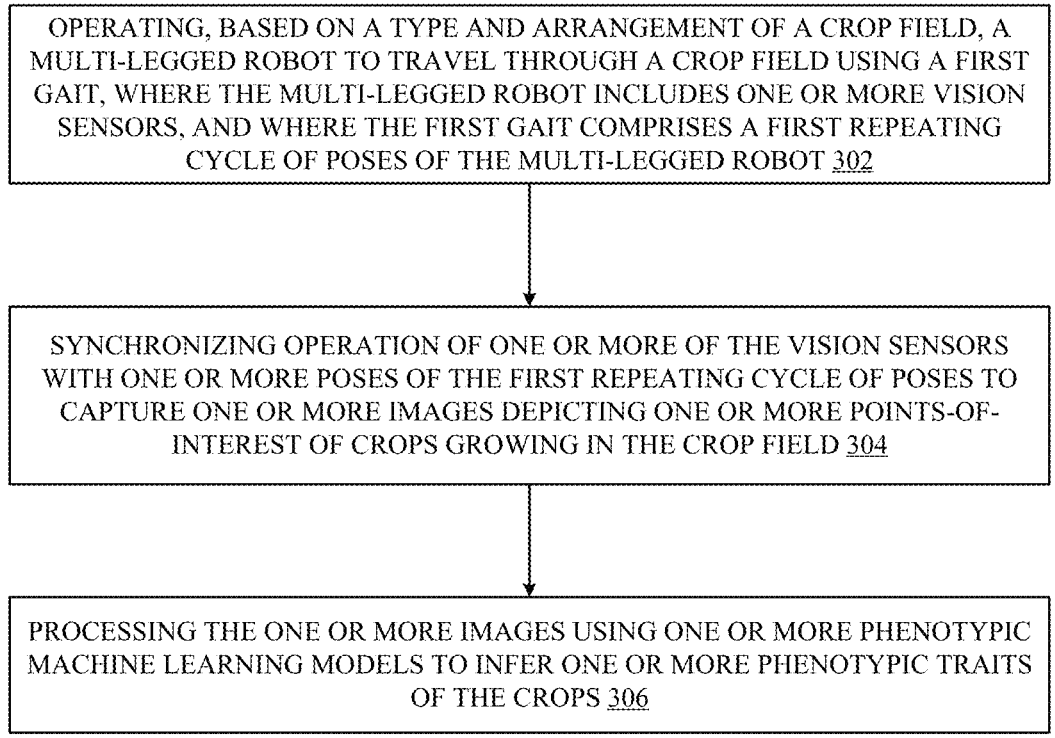
FIG. 3 illustrates an example method for a legged robot to perform crop scouting, for practicing certain aspects of the present disclosure, in accordance with various implementations.

FIG. 3 illustrates an example method 300 for crop scouting using a robot. FIG. 5A-5E illustrate an example robot to perform crop scouting, for practicing certain aspects of the present disclosure, in accordance with various implementations. As shown in FIG. 3, the method 300 can include, at block 302, operating, based on a type and arrangement of a crop field, a robot (e.g., a multi-legged robot) to travel along a trajectory through the crop field.

Figure 5A:
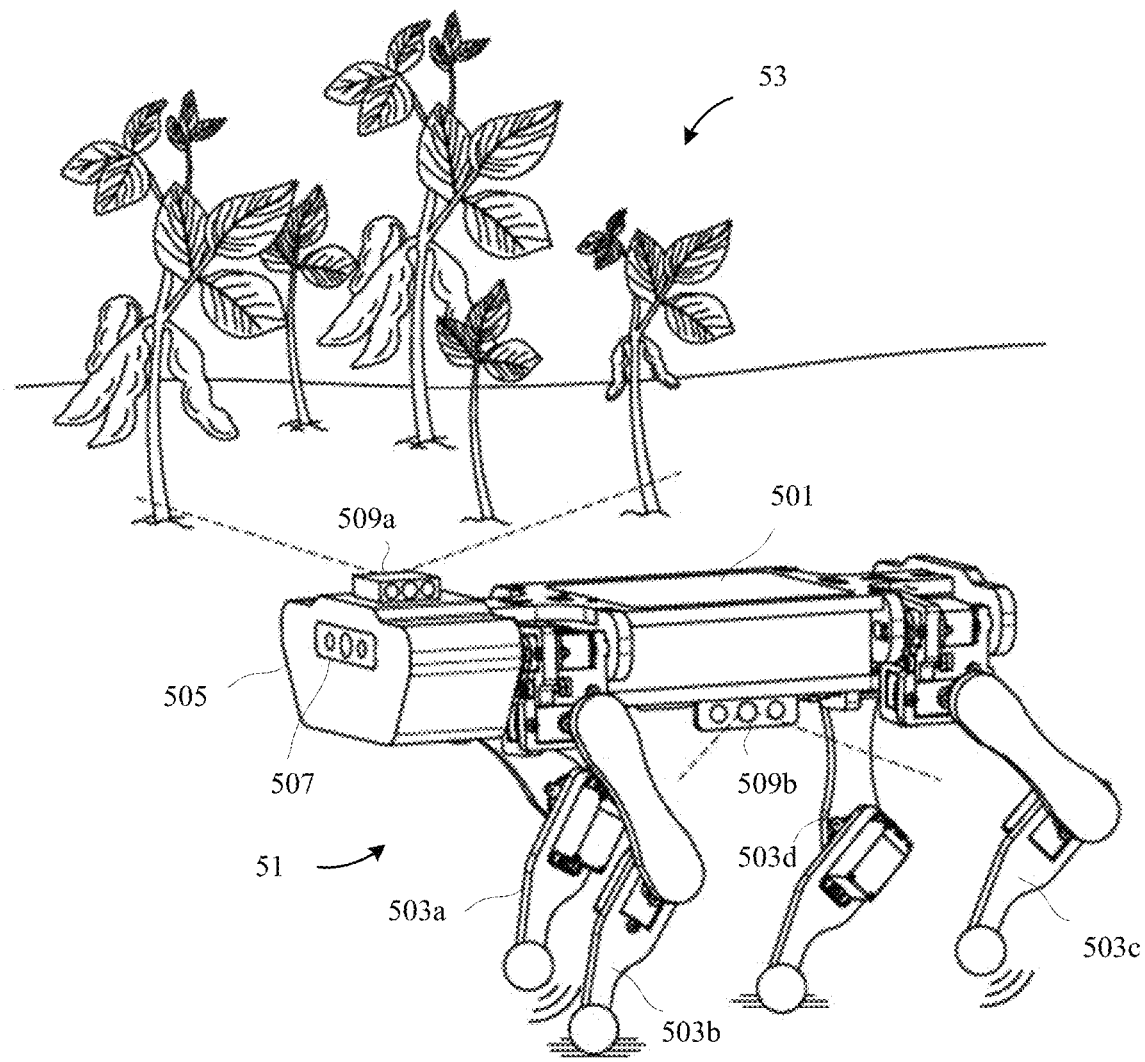
FIG. 5A, FIG. 5B, FIG. 5C, FIG. 5D, and FIG. 5E illustrate an example quadruped robot to perform crop scouting, for practicing certain aspects of the present disclosure, in accordance with various implementations.

In some embodiments, referring to FIG. 5A, the crop field can be a field containing any type of crop (the depicted crop could be, for instance, soybean plants), and the robot can be a quadruped robot 51 having a body 501 and four legs including a first leg 503a, a second leg 503b, a third leg 503c, and a fourth leg 503d. The body 501 can include a first sensor package 509b having a first set of sensors to observe crops or objects within a first field of view (indicated by the lower dashed lines in FIG. 5A). The first set of sensors can include a first vision sensor to capture images of the crops (e.g., crops that grow on the right side of the quadruped robot 51). Optionally or additionally, the quadruped robot 51 can further include a head portion 505 having a second sensor package 509a, where the second sensor package 509a can include a second set of sensors to observe crops or other objects within a second field of view (indicated by the upper dashed lines in FIG. 5A). The second set of sensors can include a second vision sensor to capture images of the crops (e.g., crops that grow on the left side of the quadruped robot 51). The head portion 505 can further include a third sensor package 507 having a third set of sensors (e.g., including a LiDAR sensor) to observe, for example, the road along which a trajectory for the quadruped robot 51 to perform crop scouting is planned.

Further, at block 302, the robot can travel through the crop field using a first gait that includes a first repeating cycle of poses of the robot, and use one or more vision sensors for capturing images of crops in the crop field. For example, referring to FIGS. 5A and 5D, the first gait of the quadruped robot 51 can be a walking gait including a walk mode in which two feet of the quadruped robot 51 contact the ground at the same time. The walk mode can at least include a first and a second pose of the quadruped robot 51 that are repeated to form the first repeating cycle of poses of the robot that travels the quadruped robot 51 along the trajectory. As shown in FIG. 5A, the first pose of the quadruped robot 51 can be a pose in which the first leg 503a and the third leg 503c are lifted off the ground while the second leg 503b and the fourth leg 503d contact the ground. The second pose of the quadruped robot 51, while not shown, can be a pose where the first leg 503a and the third leg 503c contact the ground while the second leg 503b and the fourth leg 503d are lifted off the ground. In some embodiments, the one or more of the vision sensors can include a stereo camera, where the stereo camera can be adjusted between a first depth and a second depth different from the first depth, for example, based on one or more phenotypic traits of the crops detected by one or more machine learning models (e.g., phenotypic machine learning models) that are trained to detect such phenotypic traits.

The method 300 can further include, at block 304, synchronizing operation of one or more of the vision sensors with one or more poses of the first repeating cycle of poses of the multi-legged robot to capture one or more initial sequences of images depicting one or more points-of-interest of crops growing in the crop field. In some implementations, the operations of block 304 may be performed by synchronization engine 115 or 175. For example, referring to FIG. 5D, the quadruped robot 51 can be configured to travel using the first gait (e.g., walking gait), and the height of the body 501 of the quadruped robot 51 can vary as the quadruped robot 51 switches from the first pose to the second pose (or vice versa), indicated by the curve shown in the x-y axis. For example, the height of the body 501 of the quadruped robot 51 can reach a maximal value indicated by "Peak A" when having the first pose where the first leg 503a and the third leg 503c are lifted off the ground maximally.

In some embodiments, the first pose of the quadruped robot 51 can be synchronized with the operation of the one or more vision sensors by activating, for example, the second sensor package 509a to capture an image (e.g., "IMAGE A" in FIG. 5D) of the crops whenever the quadruped robot 51 has the first pose. Accordingly, the second sensor package 509a can capture an initial sequence of images of the crops. Alternatively, or additionally, the first pose of the quadruped robot 51 can be synchronized with the operation of the one or more vision sensors by activating, for example, the first sensor package 509b to capture an image of the crops whenever the quadruped robot 51 has the first pose, thereby generating an additional initial sequence of images of the crops. The initial sequence of images of the crops and the additional initial sequence of images of the crops can together be referred to as "one or more initial sequence of images".

The method 300 can further include, at block 306, processing the one or more initial sequence of images using one or more phenotypic machine learning models to infer one or more phenotypic traits of the crops. The one or more phenotypic traits can include, for example, plant disease, size of the crops, insect, dehydration, flowering, fruit, leaf colors, etc., of the crops, and descriptions here are not intended to be limiting. The one or more phenotypic machine learning models can include, for example, a first phenotypic machine learning model that processes the "IMAGE A" in FIG. 5D to determine that the crops indicated by reference numeral 531 are infested with a leaf disease.

Figure 4:
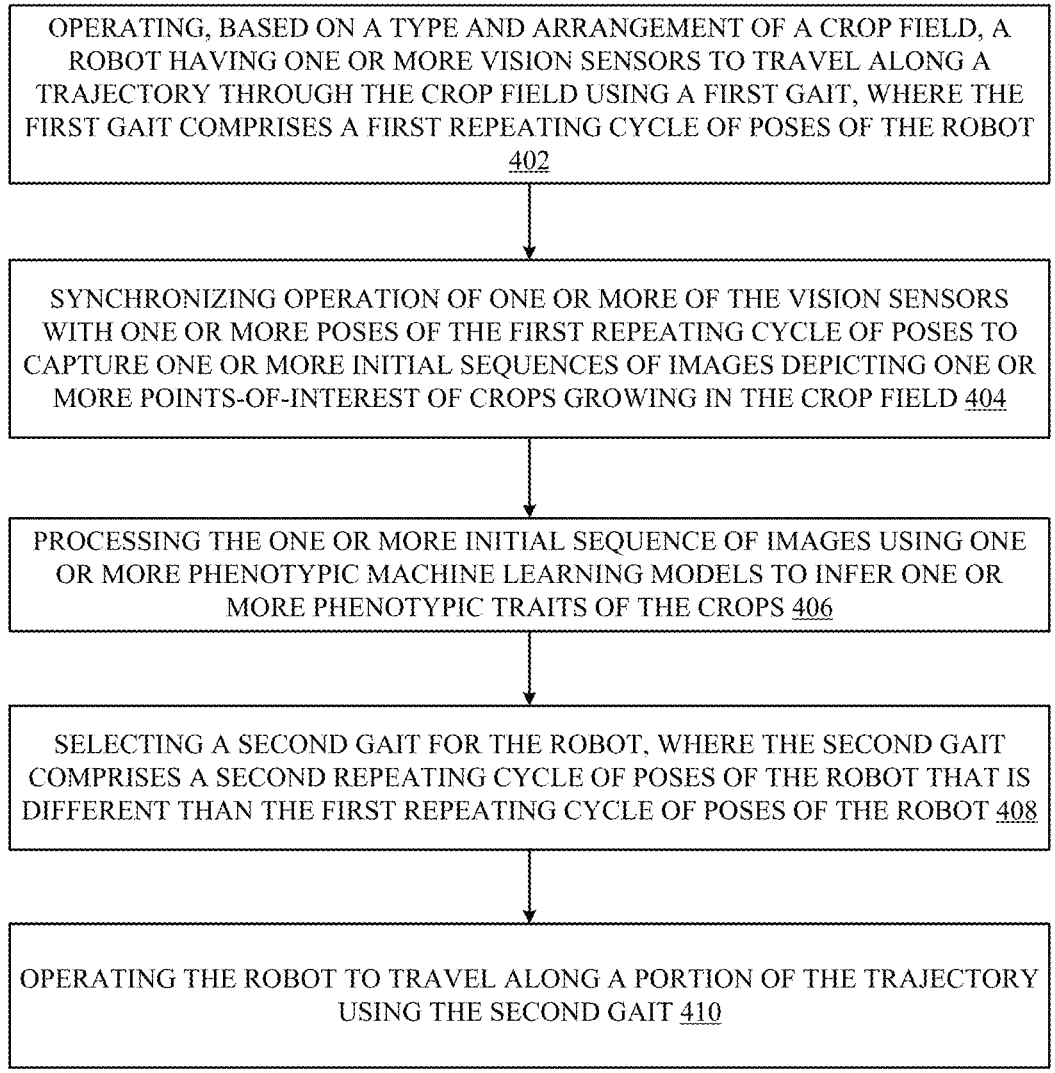
FIG. 4 illustrates another example method for a legged robot to perform crop scouting, for practicing certain aspects of the present disclosure, in accordance with various implementations.

FIG. 4 illustrates another example method 400 for crop scouting using a robot. As shown in FIG. 4, the method 400 can include, at block 402 (similar to block 302), operating, based on a type and arrangement of a crop field, a robot (e.g., a multi-legged robot or a hybrid robot) to travel along a trajectory through the crop field. The robot may travel through the crop field using a first gait that includes a first repeating cycle of poses of the robot, and can include one or more vision sensors for capturing images of crops in the crop field. The first gait can be a walking gait that includes a walk mode having at least a first pose and a second pose repeated to form a first repeating cycle of poses to operate the robot in the crop field. In some embodiments, the robot can have four or six legs, and the first pose can have a selected number (e.g., two or three) of legs contacting the ground at the same time while the second pose can have the same selected number of legs (but with different legs) contacting the ground at the same time. In the first pose, the robot can be operated to travel at a first speed.

The method 400 can further include, at block 404, synchronizing (e.g., by engine 115 or 175) operation of one or more of the vision sensors with one or more poses of the first repeating cycle of poses of the robot to capture one or more initial sequences of images depicting one or more points-of-interest of crops growing in the crop field. For example, one or more vision sensors can be operated to respectively capture an image of the crops within a corresponding field of view whenever the robot is in the first pose and/or in the second pose, thereby generating one or more initial sequences of images. Such one or more initial sequences of images can depict one or more points-of-interest of crops growing in the crop field.

The method 400 can further include, at block 406, processing the one or more initial sequence of images using one or more phenotypic machine learning models to infer one or more phenotypic traits of the crops. For example, the one or more phenotypic machine learning models can include a dehydration machine learning model trained to detect whether an image captures one or more crops that are dehydrated, a particular leaf disease machine learning model trained to detect whether an image captures one or more crops that has the particular leaf disease, and/or a blooming machine learning model trained to detect whether an image captures one or more crops that are blooming. However, these examples are not intended to be limiting, and the one or more phenotypic machine learning models can include other phenotypic machine learning models not particularly described herein, based on the user need and the scouting tasks. Referring to FIG. 5D, a first leaf disease machine learning model can be used to process the one or more initial sequence of images to determine that the leaves of the crop 531, grow in the crop field 53 and captured in the one or more initial sequence of images, is infested with the first leaf disease. It's noted that the processing can be performed onboard the robot.

The method 400 can further include, at block 408, selecting (e.g., by gait selection engine 111 or 171) a second gait for the robot, where the second gait can include a second repeating cycle of poses of the robot that is different from the first repeating cycle of poses. In some embodiments, the selecting can be triggered by a triggering event (e.g., a particular terrain condition, or the one or more phenotypic machine learning models detect a particular phenotypic trait of the crops). In some embodiments, the selecting of block 408 can be performed onboard the robot, e.g., by gait selection engine 111. The second gait, for example, can be a crawling gait that includes a crawl mode.

Figure 5B:
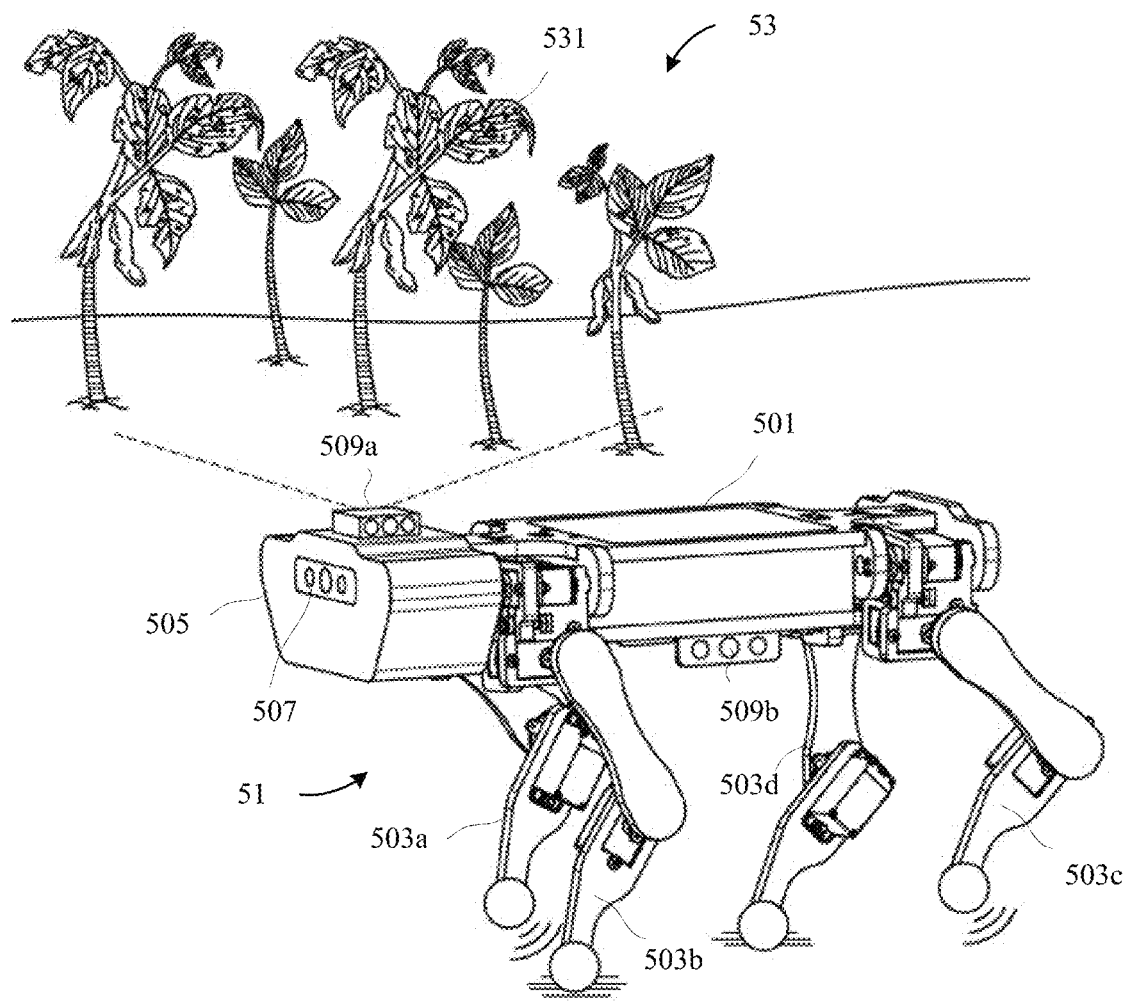
Figure 5C:
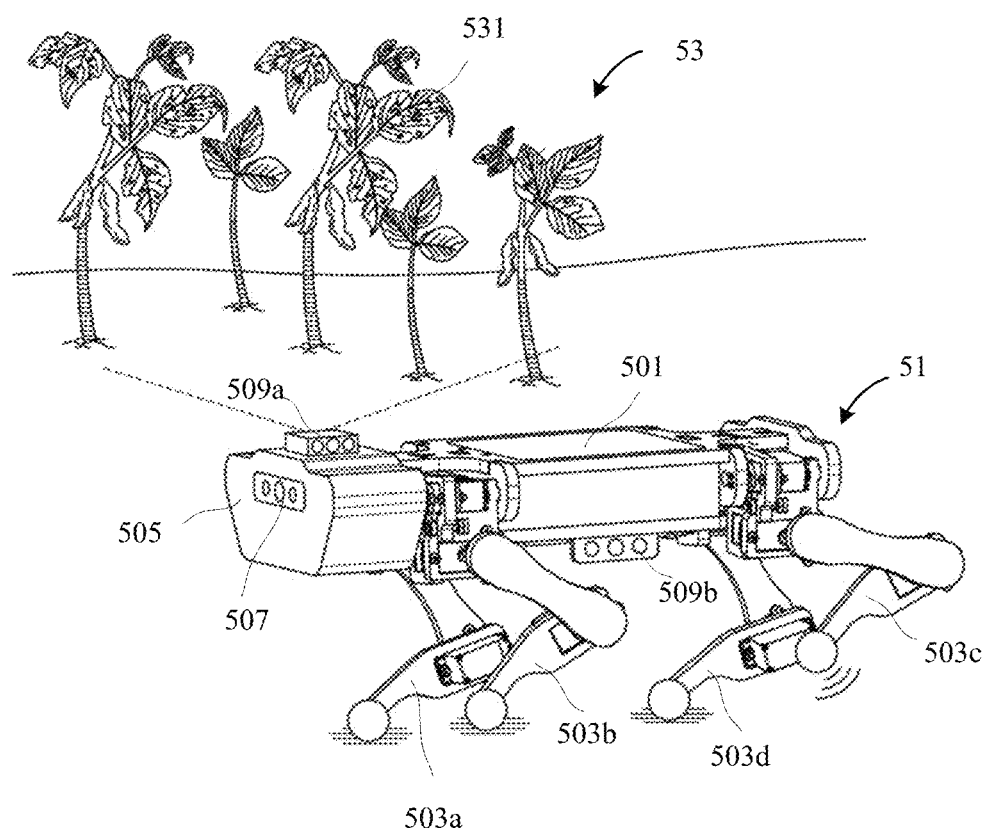
Figure 5D:
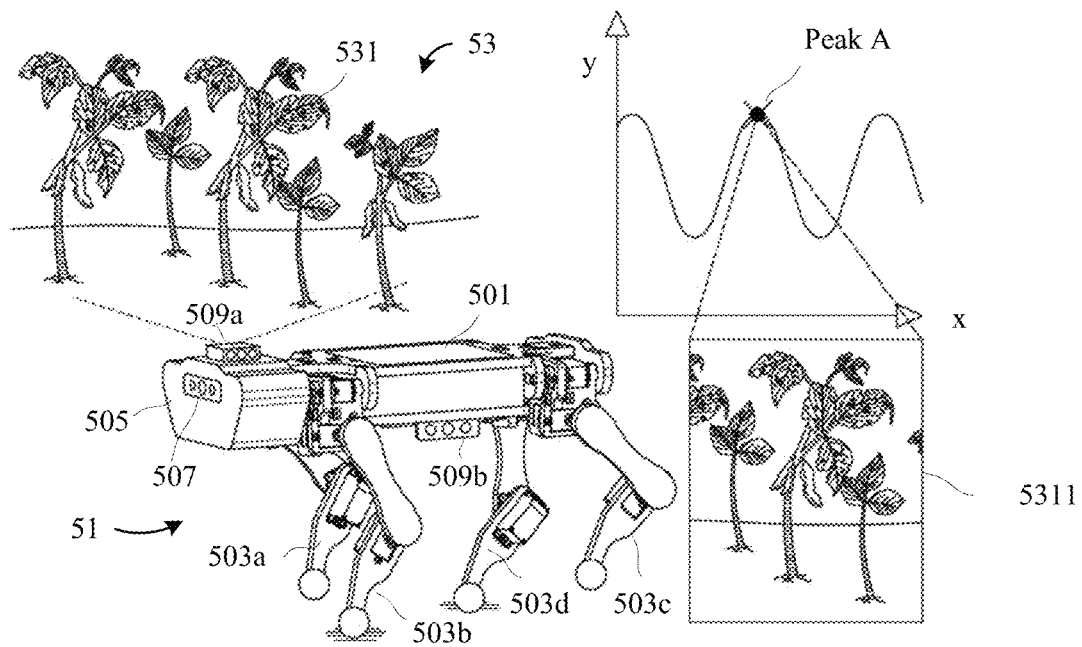
Figure 5E:
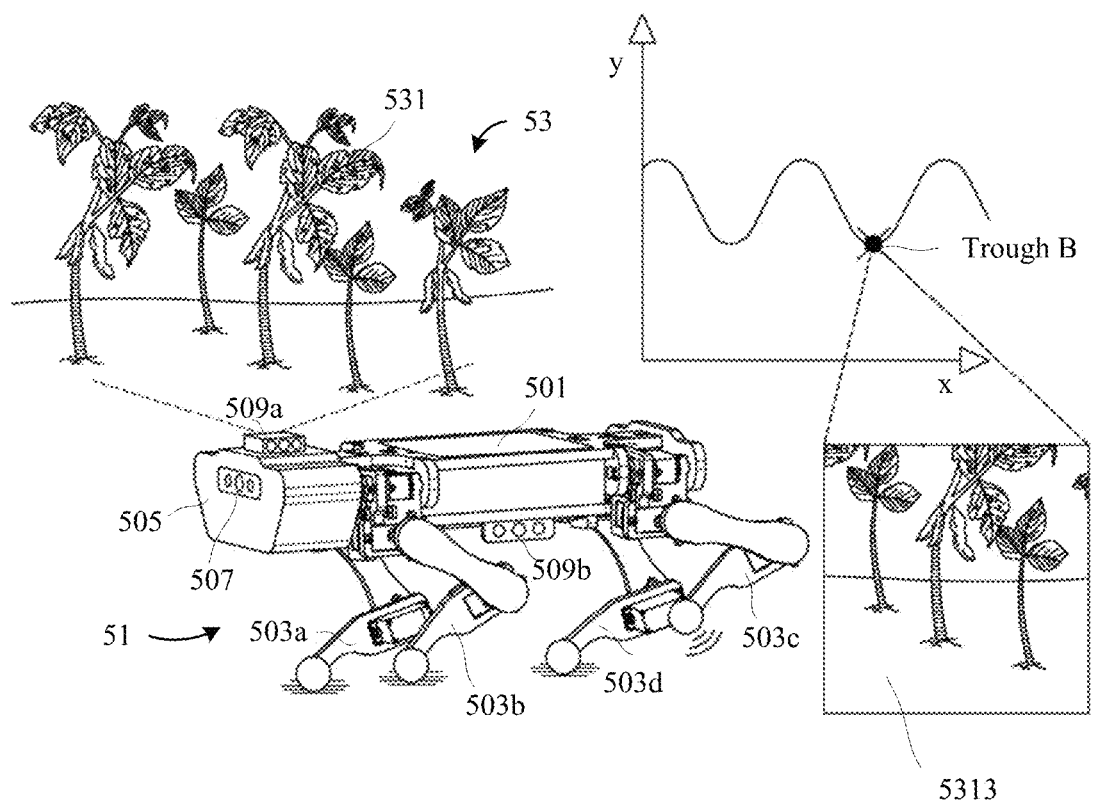

Referring to FIGS. 5B and 5C, the robot can be a quadruped robot 51 continuing to travel in the first gait as depicted in FIG. 5B, when it detects plants that appear to be afflicted with some sort of stem rot (as indicated by the shading in FIG. 5B), such as *phytophthora* root and stem rot. In response to detecting this rot, which constitutes a triggering condition, quadruped robot 51 may, e.g., by way of gait selection engine 111 and gait fulfillment engine 113, transition into the second gait depicted in FIG. 5C, i.e., the crawling gait in which three feet of the quadruped robot contact the ground at the same time. The crawl mode can include a first pose (see FIG. 5C) in which the first leg 503*a*, the second leg 503*b*, and the fourth leg 503*d* contact the ground while the third leg 503*c* is lifted off the ground. The crawl mode can include other poses where three different legs remain in contact with the ground and the rest leg is lifted off the ground. In some embodiments, the body 501 in the second gait of the robot 51 can have a lower height and/or a lower speed than the body 501 in the first gait of the robot 51.

The method 400 can further include, at block 410, operating the robot to travel along a portion of the trajectory using the second gait. When traveling using the second gait, the robot can operate one or more sensors to capture images of the crops in the crop field. In some embodiments, operation of one or more of the sensors (e.g., vision sensors) can be synchronized with one or more poses of the second repeating cycle of poses of the robot, to capture one or more alternative sequences of images of points-of-interest of the crops. For example, referring to FIG. 5E, the operation of the second sensor suite 509*a* of the robot 51 traveling using the second gait (e.g., crawl) can be synchronized with a pose (e.g., bent-down pose) of the robot 51 associated with the lowest step height (indicated by "Trough B" in FIG. 5E) during the second repeating cycle of poses. In this example, the second sensor suite 509*a* of the robot 51 can be operated to capture an image (e.g., image 5313) whenever the robot 51 have the lowest step height.

Optionally, the images of the one or more alternative sequences of images can have greater spatial resolution than images of the one or more initial sequences of images. Optionally, the images of the one or more alternative sequences of images have greater temporal resolution than images of the one or more initial sequences of images. Optionally, when the robot travels slower using the second gait than the first gait, a spatial density of images captured using the one or more vision sensors while the robot is in the second gait can be increased.

The robot having the second gait, as mentioned above, can have a slower traveling speed than having the first gait. The slowed speed may allow the robot to capture higher resolution images of certain particular points-of-interest of the crops in the crop field. Additionally or optionally, the lower height of the robot in the second gait may allow the robot to capture images of a different point-of-interest of the crops than that in the first gait. For example, referring to FIGS. 5D and 5E, the image 5311 captured by the robot in the first gait can capture an entirety of one or more crops in the crop field and the image 5313 captured by the robot in the second gait can capture a lower region (e.g., root) of the one or more crops in the crop field.

In some embodiments, the robot includes a pulling manipulator and a cutting manipulator, and the method 400 can further include: identifying a portion of one or of the crops to sample based on one or more of the inferred phenotypic traits; operating a blade of the cutting manipulator to cut the portion of one or more of the crops; and operating the pulling manipulator to transfer the cut portion to a storage compartment of the multi-legged robot. In some embodiments, the method 400 can further include: operating a manipulator to move foliage of one or more individual plants to expose previously occluded portions of the one or more individual plants.

Figure 6:
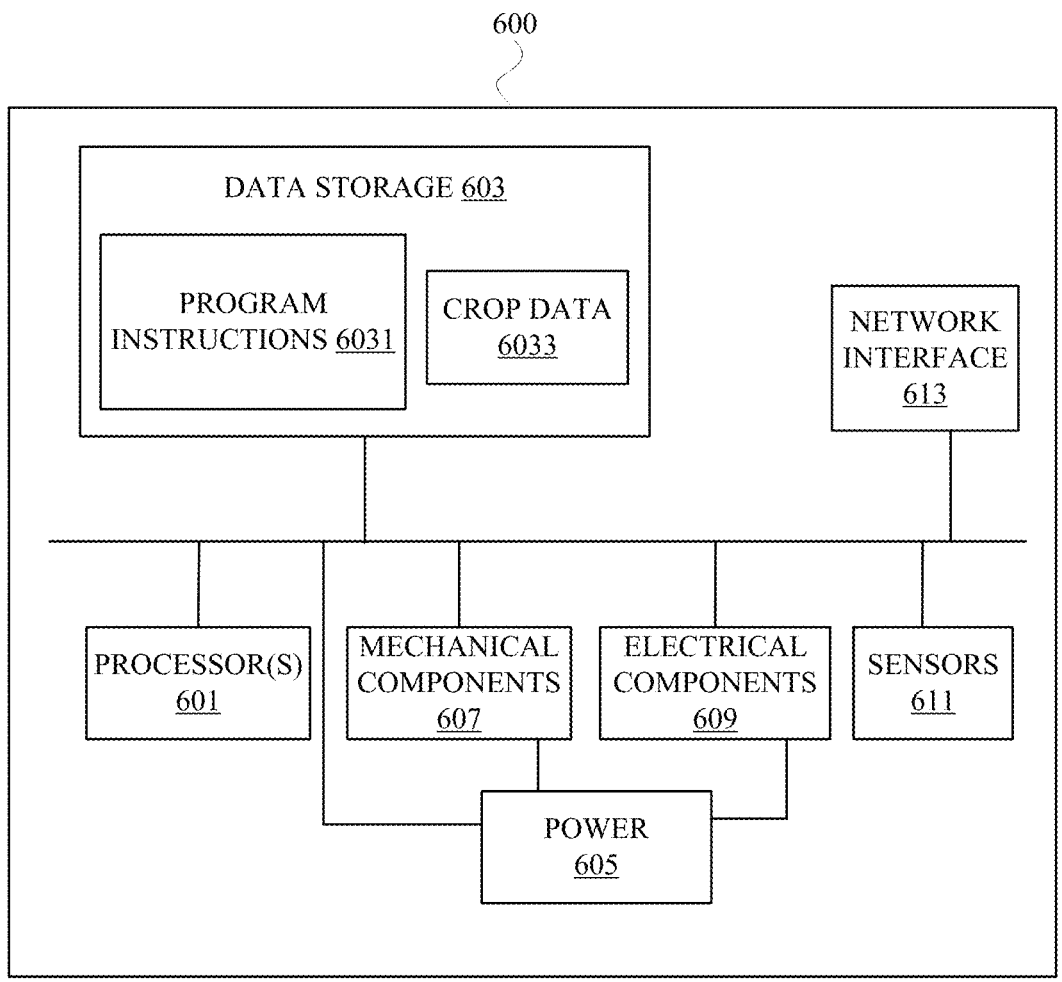
FIG. 6 illustrates a schematic configuration of a robot, for practicing certain aspects of the present disclosure, in accordance with various implementations.

FIG. 6 illustrates a schematic configuration of a robot 600, for practicing certain aspects of the present disclosure, in accordance with various implementations. The robot can be configured to operate under control of user(s), semi-autonomously, or autonomously. The robot can be a legged robot, a wheeled robot, a mobile robot, among other robot types. As shown in FIG. 6, the robot 600 can include processor(s) 601 and a data storage 603 accessible by the processor(s) 601, where the data storage 603 stores program instructions 6031 and crop data 6033. The crop data 6033 can include one or more images of the crops in the crop field, one or more health reports of the crops, crop-scouting records of the crops, various crop databases, etc. Optionally, the data storage 603 can further store one or more ML models (not shown in FIG. 6) trained specifically for one or more crop-scouting tasks. The robot 600 can further include a power 605, mechanical components 607, and electrical components 609, where the power 605 can supply power to the mechanical components 607 and the electric components 609, among other components of the robot 600.

The robot 600 can further include one or more sensors 611, where the one or more sensors 611 can be selected to include a variety of sensors (vision sensor, PH meter, humidity sensor, etc.) suitable for crop scouting. The robot 600 can further include a network interface 613 via which the robot 600 may communicate with one or more remote servers, for example, to access models more comprehensively trained, to transfer crop data to the remote servers for access by certain users, and/or to receive instant instructions from the users.

Figure 7:
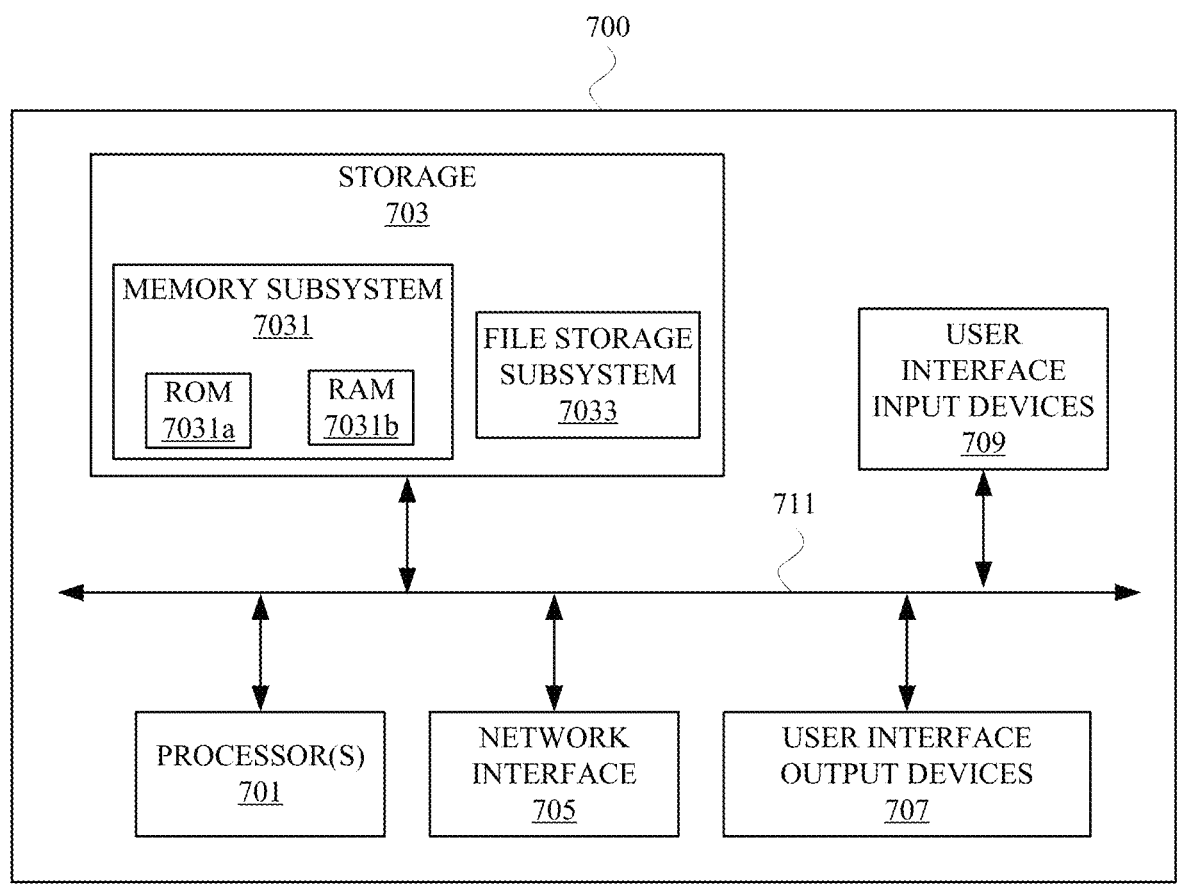
FIG. 7 illustrates an example architecture of a computing system, for practicing certain aspects of the present disclosure, in accordance with various implementations.

FIG. 7 illustrates an example architecture of a computing system 700, for practicing certain aspects of the present disclosure, in accordance with various implementations. The computing system 700 may be, for example, a server, that is utilized to perform one or more aspects of techniques described herein. Computing device 700 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing system 700. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing system 700 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing system 700 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing system 700 to the user or to another machine or computing device.

Storage subsystem 724 stores programming and data constructs that provide the functionality of some or all of the modules described herein. For example, the storage subsystem 724 may include the logic to perform selected aspects of methods 300 and 400 described herein, as well as to implement various components depicted in FIG. 6.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing system 700 communicate with each other as intended. Although bus subsystem 712 is shown schematically as a single bus, alternative implementations of the bus subsystem may use multiple buses.

Computing system 700 can be of varying types including a workstation, server, computing cluster, blade server, server farm, or any other data processing system or computing device. Due to the ever-changing nature of computers and networks, the description of computing system 700 depicted in FIG. 7 is intended only as a specific example for purposes of illustrating some implementations. Many other configurations of computing system 700 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:
    operating, based on a type and arrangement of a crop field, a multi-legged robot to travel along a trajectory through the crop field using a first gait, wherein the multi-legged robot includes one or more vision sensors and the first gait includes a first repeating cycle of poses of the multi-legged robot;
    synchronizing operation of one or more of the vision sensors with one or more poses of the first repeating cycle of poses of the multi-legged robot to capture one or more initial sequences of images depicting one or more points-of-interest of crops growing in the crop field;
    processing the one or more initial sequence of images using one or more phenotypic machine learning models to infer one or more phenotypic traits of the crops;
    selecting a second gait based on one or more of the inferred phenotypic traits of the crops, wherein the second gait includes a second repeating cycle of poses of the multi-legged robot that is different than the first repeating cycle of poses of the multi-legged robot; and
    operating the multi-legged robot to travel along a portion of the trajectory using the second gait.

2. The method of claim 1, wherein one or more of the inferred phenotypic traits of the crops includes sizes of the one or more crops.

3. The method of claim 1, wherein the second gait is selected based on one or more terrain conditions of the crop field detected by one or more sensors of the multi-legged robot.

4. The method of claim 1, further including synchronizing operation of one or more of the vision sensors with one or more poses of the second repeating cycle of poses of the multi-legged robot to capture one or more alternative sequences of images of points-of-interest of the crops.

5. The method of claim 4, wherein images of the one or more alternative sequences images have greater spatial resolution than images of the one or more initial sequences of images.

6. The method of claim 4, wherein images of the one or more alternative sequences images have greater temporal resolution than images of the one or more initial sequences of images.

7. The method of claim 1, wherein the multi-legged robot travels slower using the second gait than the first gait, thereby increasing a spatial density of images captured using the one or more vision sensors.

8. The method of claim 1, wherein the first and second gaits have different step heights.

9. The method of claim 1, wherein the multi-legged robot includes a quadruped robot, the first gait includes a walk mode in which two feet of the quadruped robot contact a ground of the crop field at the same time, and the second gait includes a crawl mode in which three feet of the quadruped robot contact the ground at the same time.

10. The method of claim 1, wherein the processing and selecting are performed onboard the multi-legged robot.

11. The method of claim 1, wherein one or more of the vision sensors are coupled to the multi-legged robot via a first manipulator that is rotatable and extendable.

12. The method of claim 1, wherein one or more of the vision sensors includes a stereo camera, and wherein the method further includes adjusting the stereo camera between a first depth and a second depth different from the first depth based on one or more of the inferred phenotypic traits of the crops.

13. The method of claim 1, wherein the multi-legged robot includes a pulling manipulator and a cutting manipulator, and the method further includes:
  identifying a portion of one or more of the crops to sample based on one or more of the inferred phenotypic traits;
  operating a blade of the cutting manipulator to cut the portion of one or more of the crops; and
  operating the pulling manipulator to transfer the cut portion to a storage compartment of the multi-legged robot.

14. The method of claim 1, further including operating a manipulator to move foliage of one or more individual plants to expose previously occluded portions of the one or more individual plants.

15. A method implemented using one or more processors, the method comprising:
  operating, based on a type and arrangement of a crop field, a multi-legged robot to travel along a trajectory through the crop field using a first gait, wherein the multi-legged robot includes one or more vision sensors, and wherein the first gait includes a first repeating cycle of poses of the multi-legged robot;
  processing one or more initial sequence of images using one or more phenotypic machine learning models to infer one or more phenotypic traits of crops growing in the crop field;
  based on one or more of the inferred phenotypic traits, selecting a second gait, wherein the second gait includes a second repeating cycle of poses of the multi-legged robot that is different than the first repeating cycle of poses of the multi-legged robot; and
  operating the multi-legged robot to travel along a portion of the trajectory using the second gait.

16. A multi-legged robot comprising one or more processors and memory storing instructions that, in response to execution of the instructions, cause the one or more processors to:
  operate, based on a type and arrangement of a crop field, the multi-legged robot to travel along a trajectory through the crop field using a first gait, wherein the multi-legged robot includes one or more vision sensors, and wherein the first gait includes a first repeating cycle of poses of the multi-legged robot;
  synchronize operation of one or more of the vision sensors with one or more poses of the first repeating cycle of poses of the multi-legged robot to capture one or more initial sequences of images depicting one or more points-of-interest of crops growing in the crop field;
  process the one or more initial sequence of images using one or more phenotypic machine learning models to infer one or more phenotypic traits of the crops;
  select a second gait based on one or more of the inferred phenotypic traits of the crops, wherein the second gait includes a second repeating cycle of poses of the multi-legged robot that is different than the first repeating cycle of poses of the multi-legged robot; and
  operate the multi-legged robot to travel along a portion of the trajectory using the second gait.

17. The multi-legged robot of claim 16, wherein one or more of the inferred phenotypic traits of the crops includes sizes of the one or more crops.

18. The multi-legged robot of claim 16, wherein the second gait is selected based on one or more terrain conditions of the crop field detected by one or more sensors of the multi-legged robot.

19. The multi-legged robot of claim 16, wherein one of more of the processors are to synchronize operation of one or more of the vision sensors with one or more poses of the second repeating cycle of poses of the multi-legged robot to capture one or more alternative sequences of images of points-of-interest of the crops.

20. The multi-legged robot of claim 19, wherein images of the one or more alternative sequences images have greater spatial resolution than images of the one or more initial sequences of images.

* * * * *